(12) United States Patent
Takemoto et al.

(10) Patent No.: US 7,175,421 B2
(45) Date of Patent: Feb. 13, 2007

(54) SLIDE CORE UNIT

(75) Inventors: Michinori Takemoto, 23-6, Kamishima-cho, Kadoma-shi, Osaka 571-0071 (JP); Izumi Ichikawa, Tokyo (JP)

(73) Assignees: Michinori Takemoto (JP); Misumi Corporation (JP)

( * ) Notice: Subject to any disclaimer, the term of this patent is extended or adjusted under 35 U.S.C. 154(b) by 351 days.

(21) Appl. No.: 10/487,896

(22) PCT Filed: Apr. 17, 2003

(86) PCT No.: PCT/JP03/04883

§ 371 (c)(1),
(2), (4) Date: Feb. 26, 2004

(87) PCT Pub. No.: WO03/089216

PCT Pub. Date: Oct. 30, 2003

(65) Prior Publication Data

US 2004/0247726 A1    Dec. 9, 2004

(30) Foreign Application Priority Data

Apr. 19, 2002 (JP) ............................ 2002-117874
Apr. 11, 2003 (JP) ............................ 2003-108025

(51) Int. Cl.
*B29C 33/44* (2006.01)
*B29C 45/33* (2006.01)

(52) U.S. Cl. .............................. 425/577; 425/DIG. 58; 264/318

(58) Field of Classification Search ................ 425/190, 425/192 R, 577, DIG. 58; 264/318
See application file for complete search history.

(56) References Cited

U.S. PATENT DOCUMENTS 1,776,888 A * 9/1930 Clark .......................... 264/296
6,461,137 B1 * 10/2002 Ash et al. .................... 425/127

FOREIGN PATENT DOCUMENTS

| JP | 4292920 | 10/1992 |
|----|---------|---------|
| JP | 3001055 | 6/1994 |
| JP | 9216251 | 8/1997 |
| JP | 11320617 | 11/1999 |

* cited by examiner

*Primary Examiner*—Donald Heckenberg
(74) *Attorney, Agent, or Firm*—Adams & Wilks

(57) ABSTRACT

The configuration is such that there are provided a slide core 21 (21A) disposed to be movable toward and away from a cavity (molding space) 8a and driven at least in the direction toward the cavity 8a according to the closing action of a mold 8, and a guiding member (guiding means) 11 (11A) disposed at least on one mold member 7 of the mold and having a groove-shaped rail part 12a for supporting the slide core 21 in the directions toward and away from the cavity 8a, wherein one member out of the slide core 21 and guiding means 11 is provided with urging means for urging the slide core relative to the guiding member 11 in the direction away from the cavity 8a. This configuration makes it possible to reduce the size and the maintenance cost of the slide core.

11 Claims, 16 Drawing Sheets

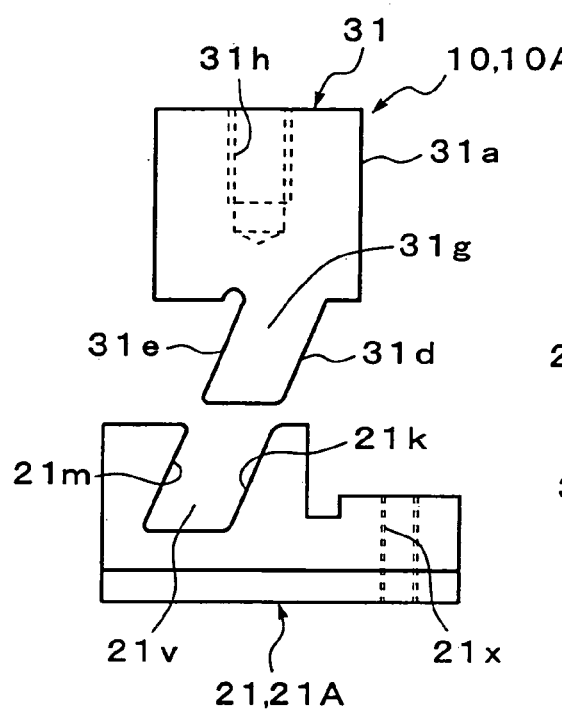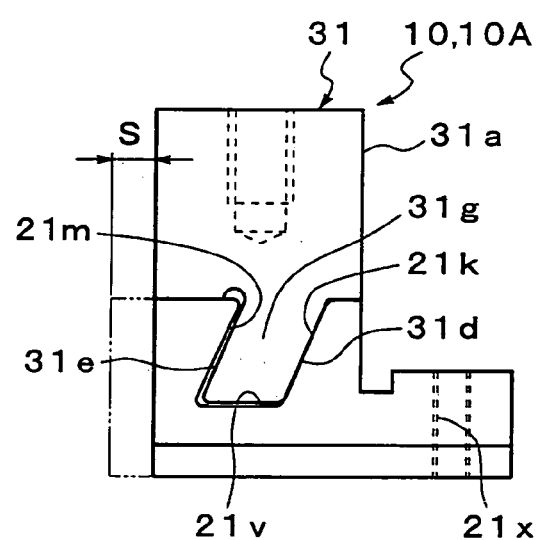

SLIDE CORE UNIT

CROSS REFERENCE TO RELATED APPLICATIONS

This application is a U.S. national stage application of copending International Application No. PCT/JP03/04883, filed Apr. 17, 2003, and published in a non-English language.

TECHNICAL FIELD

The present invention relates to a slide core unit installed in a mold.

BACKGROUND ART

As a mold for use in an injection molding machine, what is illustrated in FIG. 19a and FIG. 19b is known, for instance. In this drawing, reference numeral 1 denotes a mold, which is configured as a paired structure provided with a stationary mold member 2 and a movable mold member 3. The stationary mold member 2 and the movable mold member 3 are respectively fixed to the stationary platen and the movable platen of an injection molding machine (not shown), for instance. A movement of the movable platen toward the stationary platen results in a closed state in which the movable mold member 3 is in contact with the stationary mold member 2, and a movement of the movable platen away from the stationary platen results in an open state in which the movable mold member 3 is away from the stationary mold member 2.

In the mold 1, when it is in the closed state, the respective mating faces 2a and 3a of the stationary mold member 2 and the movable mold member 3 are in a state of being tightly contacted to each other to form a cavity (molding space) 1a which is to be filled with molten resin. Further, the mold 1 allows a molding A made of a resin solidified within the cavity 1a to be taken out by opening the mold members.

However, if the molding A has an undercut A1 as shown in FIG. 19a and FIG. 19b, the part of the cavity 1a corresponding to the undercut A1 will have to be formed in the core portion 4a of a slide core 4. Incidentally, the core portion 4a may be configured either integrally with or as a body separable from the slide core 4 to which the body can be attached and from which the body can be detached.

The slide core 4, by being installed in a groove-shaped rail portion 3b in the movable mold member 3, is supported to be able to move toward and away from the cavity 1a. The slide core 4 further has a slanted guide hole 4b into which an angular pin 5 is to be inserted. The angular pin 5, fitted to the stationary mold member 2, is so configured as to obliquely protrude from the mating face 2a.

In the same drawing, reference numeral 2b denotes a locking block which, when the cavity 1a is filled with highly pressurized resin, prevents the core portion 4a from receding from the cavity 1a; reference numeral 3d, a stopper pin for holding the slide core 4 in a retreated position; and reference numeral 3d, an ejector pin 3d for separating the molding A from the cavity 1a part.

In the mold 1 configured as described above, when it is closed as shown in FIG. 19a, the angular pin 5 is inserted into the guide hole 4b of the slide core 4, which is thereby moved toward the cavity 1a and eventually the core portion 4a constitutes a part of the cavity 1a. Then, after the mold 1 is clamped, the cavity 1a is filled with molten resin and, after the resin has solidified, the mold is opened as shown in FIG. 19b.

When the mold is opened, the slide core 4 is moved by the angular pin 5 in the direction away from the cavity 1a. As this brings the core portion 4a into a state in which it is removed from the undercut A1 of the molding A, the molding A can be separated from the cavity 1a part and taken out by operating the ejector pin 3d.

There may be a case in which the slide core 4 is installed movably in the vertical direction. In this case, the slide core 4 in the state in which the mold is open is subject to a downward force by gravity, and to prevent a downward movement of the slide core 4 it is necessary to urge the slide core 4 all the time in the direction away from the cavity 1a by providing the slide core 4 with a spring 3e as shown in FIG. 20.

However, if the slide core 4 is provided with the spring 3e, there will arise a problem that the size of the slide core 4 is enlarged, because a hole 4c for embedding the spring 3e has to be bored in the slide core 4. Moreover, as the groove-shaped rail portion 3b for slidably supporting the slide core 4 is provided directly in the movable mold member 3, the whole movable mold member 3 has to be replaced when the rail portion 3b has been worn out by the sliding movement of the slide core 4, resulting in a corresponding increase in the maintenance cost of the mold 1.

SUMMARY OF THE INVENTION

An object of the present invention, attempted in view of the circumstance described above, is to reduce the size of the slide core and the maintenance cost of the mold.

In order to solve the problem noted above, according to a first aspect of the invention, there is provided a slide core unit to be installed in a mold configured to be openable and closable and having at least a pair of mold members which form a molding space when in a closed state, wherein the slide core unit comprises: a slide core disposed to be movable in forward and backward directions toward and away from the molding space and driven in a forward direction toward the molding space at least in response to a closing action of the mold; and a guiding means installed on at least one of the mold members and supporting the slide core to be movable in the forward and backward directions toward and away from the molding space, and one member out of the slide core and the guiding means is provided with urging means for urging the slide core relative to the guiding means in a backward direction away from the molding space.

In a second aspect of the invention, the urging means comprises: a guide hole bored in the one member and extending in the forward and backward directions; a moving piece provided in the guide hole to be movable in the forward and backward directions; an elastic body provided in the guide hole and giving an elastic force to the moving piece; a long hole penetrating the other member, different from the one member, out of the slide core and the guiding means from within the guide hole and formed long in the forward and backward directions; and a pin which is inserted into the long hole and of which the base end is fixed to the moving piece and the tip protrudes toward the other member, and the other member is provided with a concave portion with which the tip of the pin is to engage, and the elastic body is disposed within the guide hole to urge the slide core in the backward direction with an elastic force working via the moving piece.

According to a third aspect of the invention, there is provided a slide core unit to be installed in a mold configured to be openable and closable and having at least a pair of mold members which form a molding space when in a closed state wherein the slide core unit comprises: a slide core disposed to be movable in forward and backward directions toward and away from the molding space and driven in a forward direction toward the molding space at least in response to a closing action of the mold; and a guiding means installed on at least one of the mold members and supporting the slide core to be movable in the forward and backward directions toward and away from the molding space, and the slide core is provided with urging means for urging the slide core relative to the guiding means in a backward direction away from the molding space.

In a fourth aspect of the invention, the urging means comprises: a guide hole bored in the slide core and extending in the forward and backward directions; a moving piece disposed in the guide hole to be movable in the forward and backward directions; an elastic body disposed in the guide hole to urge the moving piece in the forward direction toward the molding space; a long hole penetrating from inside the guide hole toward the guiding means and formed long in the forward and backward directions; and a pin which is inserted into the long hole and of which the base end is fixed to the moving piece and the tip protrudes toward the guiding means, and the guiding means is provided with a concave portion with which the tip of the pin is to engage.

According to a fifth aspect of the invention, there is provided a slide core unit to be installed in a mold configured to be openable and closable and having at least a pair of mold members which form a molding space when in a closed state, wherein the slide core unit comprises: a slide core disposed to be movable in forward and backward directions toward and away from the molding space and driven in a forward direction toward the molding space at least in response to a closing action of the mold; and a guiding means installed on at least one of the mold members and supporting the slide core to be movable in the forward and backward direction toward and away from the molding space, and the guiding means is provided with urging means for urging the slide core relative to the guiding means in a backward direction away from the molding space.

In a sixth aspect of the invention, the urging means comprises: a guide hole bored in the guiding means and extending in the forward and backward directions; a moving piece disposed in the guide hole to be movable in the forward and backward directions; an elastic body disposed in the guide hole to urge the moving piece in the backward direction; a long hole penetrating from inside the guide hole toward the guiding means and formed long in the forward and backward directions; and a pin which is inserted into the long hole and of which the base end is fixed to the moving piece and the tip protrudes toward the slide core, and the slide core is provided with a concave portion with which the tip of the pin is to engage.

In a seventh aspect of the invention, the mold member on which the guiding means is to be disposed is provided with a space between a rail portion movably supporting the slide core disposed in the guiding means and an outer end of the mold member to thereby permit the slide core to be inserted into the space.

In an eighth aspect of the invention, one of the slide core and the guiding means has a ball plunger for holding the slide core in its standby position away from the molding space to a prescribed extent with a greater force than an urging force of the urging means.

According to the invention, since the guiding means for guiding the slide core in the forward and backward directions is disposed on a mold member, even if the movements of the slide core have worn off the guiding means, only the guiding means will need to be replaced but not the mold member on which the guiding means is disposed. Accordingly, the maintenance cost of the mold can be reduced.

According to the invention, since the slide core can be urged with respect to the guiding means in the direction away from the molding space via the pin protruding from one member out of the slide core and the guiding means toward the other member, eventually an elastic force will work along the part where the slide core and the guiding means slide relative to each other. Accordingly, the slide core can be moved stably backward.

According to the invention, since the slide core is provided with urging means for urging the slide core in the backward direction with respect to the guiding means, it is possible to simplify and reduce the size of the structure of the guiding means. Accordingly, the cost of maintenance required for replacing the guiding means can be reduced.

According to the invention, though the moving piece disposed in the guide hole is urged toward the molding space by the elastic force of the elastic body, as the tip of the pin is engaged with the concave portion of the guiding means, the slide core is urged in the direction away from the molding space by the reactionary force in which the concave portion is to be a fulcrum. In this case again, since the elastic force works via the pin along the part where the slide core and the guiding means slide relative to each other, the slide core can be moved stably backward.

According to the invention, since there is disposed guiding means for guiding the slide core in the forward and backward directions and this guiding means is provided with urging means for urging the slide core in the backward direction, the slide core can be reduced in size compared with the prior art according to which the slide core is provided with a spring. Moreover, since there is no need to bore a hole in which to embed the spring, the machining of the slide core can be simplified correspondingly. Therefore, the manufacturing cost can be reduced, and at the same time the cost of maintenance required for replacing the slide core can be reduced.

According to the invention, since the urging means comprises a guide hole bored in the guiding means, a moving piece disposed in the guide hole to be movable in the forward and backward directions, an elastic body for urging the moving piece in the backward direction, a long hole penetrating from inside the guide hole toward the slide core, and a pin which is inserted into the long hole and of which the base end is fixed to the moving piece and the tip protrudes toward the slide core, wherein the tip of the pin is engaged with a concave portion in the slide core, the elastic force working from the elastic body on the moving piece can be brought to work on the slide core via the pin to move the slide core in the direction away from the molding space. In this case again, since the elastic force works via the pin along the part where the slide core and the guiding means slide relative to each other, the slide core can be moved stably backward.

According to the invention, since a space through which the slide core can be inserted is provided between the rail portion movably supporting the slide core in the guiding means and the outer end of the mold member, the slide core can be taken out of the rail portion in the guiding means in a state in which, for instance, the mold is opened. Therefore, when the slide core and the core part fitted to the slide core, for instance, need repair or replacement, the repair or replacement can be easily accomplished without having to remove the mold from the injection molding machine or the like.

According to the invention, since one of the slide core and the guiding means has a ball plunger for holding the slide core in its standby position away from the molding space to a prescribed extent with a greater force than the urging force of the urging means, the slide core does not come off the guiding means in normal opening or closing process, and the slide core can be taken off the guiding means by applying an external force greater than a prescribed magnitude. Therefore, because there is no need to use a tool for attaching the slide core to the guiding means or detaching the former from the latter, there is an advantage that the work to attach or detach the slide core is simplified.

BRIEF DESCRIPTION OF THE DRAWINGS

FIG. 3a through FIG. 3d show the slide core of the slide core unit, wherein FIG. 3a is a front view, FIG. 3b, a side view, FIG. 3c, a plan view and FIG. 3d, a sectional view taken along line D—D in FIG. 3b;

FIG. 4a through FIG. 4d show the angular cam of the slide core unit, wherein FIG. 4a is a front view, FIG. 4b, a side view, FIG. 4c, a bottom view and FIG. 4d, a sectional view taken along line D—D in FIG. 4b;

FIG. 13a and FIG. 13b show the guiding member of the slide core unit, wherein FIG. 13a is a plan view and FIG. 13b, a sectional view;

FIG. 14a through FIG. 14e show the slide core of the slide core unit, wherein FIG. 14a is a front view, FIG. 14b, a side view, FIG. 14c, a plan view, FIG. 14d, a bottom view and FIG. 14e, a sectional view taken along line E—E in FIG. 14b;

FIG. 18a and FIG. 18b show a slide core and an angular cam with a meshing structure different from that of the slide core and the angular cam in either of the slide core units in the first and second embodiments of the invention, wherein FIG. 18a showing the state before the slide core is driven and FIG. 18b, showing the state after the slide core has been driven;

FIG. 19a and FIG. 19b show a slide core unit cited as an example of the prior art, wherein FIG. 19a is a sectional view showing a state after the stationary mold member and the movable mold member have been closed and FIG. 19b, a sectional view showing a state after the stationary mold member and the movable mold member have been opened.

DETAILED DESCRIPTION OF THE INVENTION

The embodiment of the present invention will be described below with reference to FIG. 1 through FIG. 18b.

First Embodiment

To begin with, a first embodiment will be described with reference to FIG. 1 through FIG. 9. Constituent elements in common with the prior art are denoted by respectively the same reference signs, and their description will be simplified.

Figure 8:
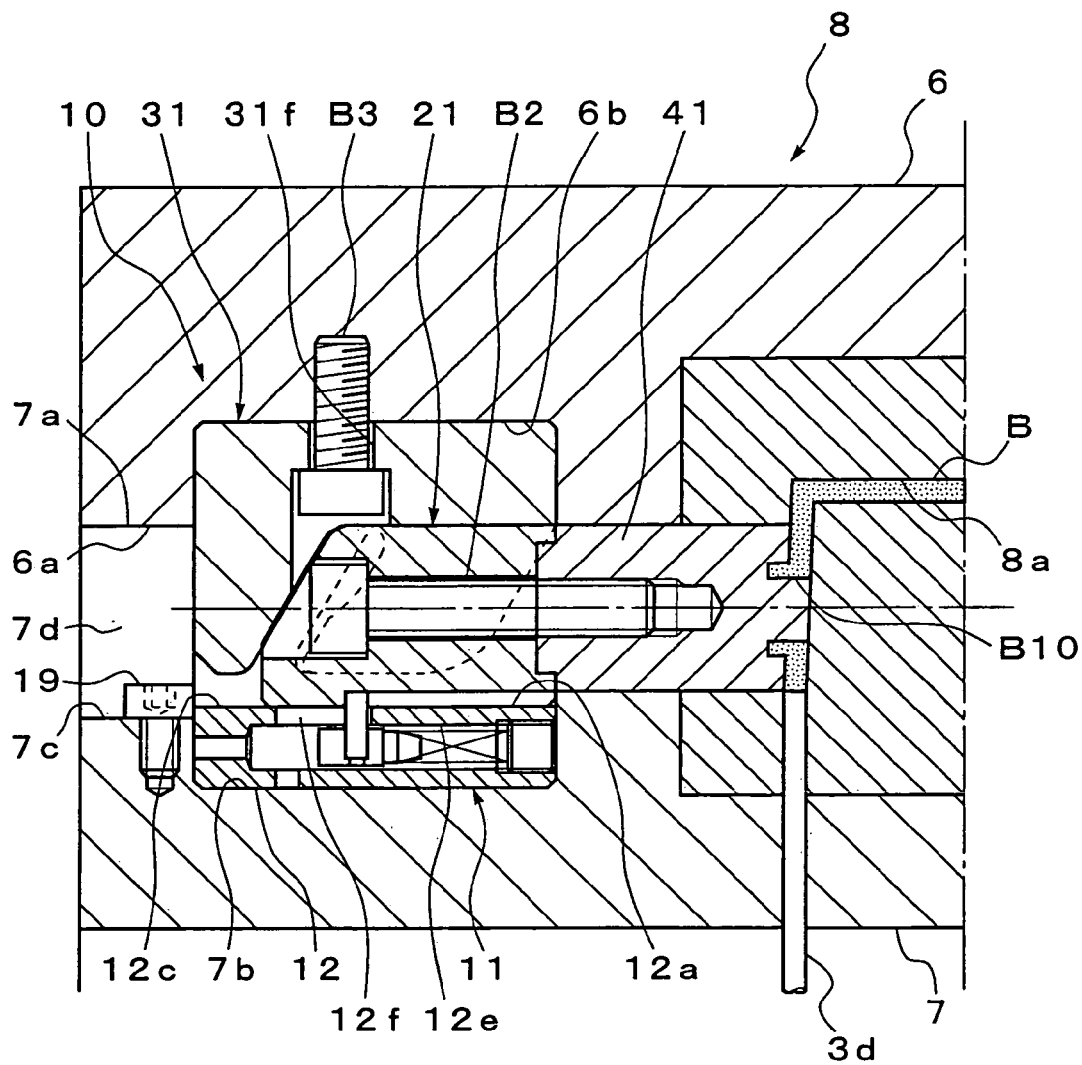
FIG. 8 is a sectional view of the slide core unit, showing a state after the stationary mold member and the movable mold member have been closed.
Figure 9:
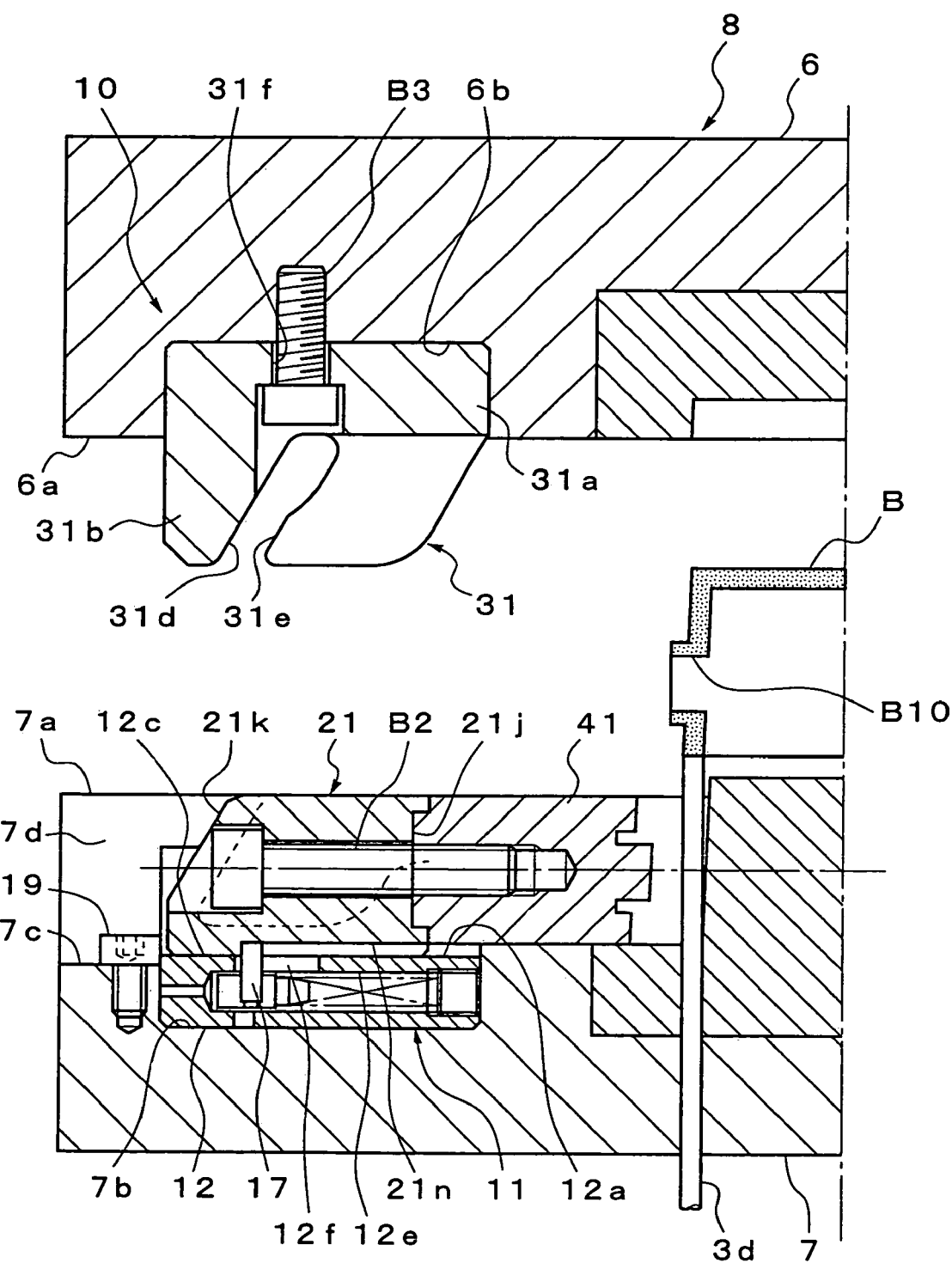
FIG. 9 is a sectional view of the slide core unit, showing a state after the stationary mold member and the movable mold member have been opened.

A slide core unit 10 in this embodiment is to be installed in a mold 8 as shown in FIG. 8 and FIG. 9. The mold 8 is configured as a paired structure provided with a stationary mold member 6 and a movable mold member 7 configured to be openable and closable, and these stationary mold member 6 and movable mold member 7 are respectively fixed to the stationary platen and the movable platen of an injection molding machine (not shown). The injection molding machine drives the movable mold member 7 in the opening or closing direction by moving the movable platen away from or toward the stationary platen.

In the mold 8, as shown in FIG. 8, when it is in the closed state, the respective mating faces 6a and 7a of the stationary mold member 6 and the movable mold member 7 are in a state of being tightly contacted to each other to form a cavity (molding space) 8a which is to be filled with molten resin. Further, the mold 8 allows a molding B made of a resin solidified within the cavity 8a to be taken out by opening the mold members and sticking it out with an ejector pin 3d as shown in FIG. 9.

The slide core unit 10 is provided with a guiding member (guiding means) 11 fixed to the movable mold member 7, which is one of the mold members, a slide core 21 supported by the guiding member 11 to be linearly movable, and an angular cam 31 fixed to the stationary mold member 6, which is the other mold member.

Figure 1:
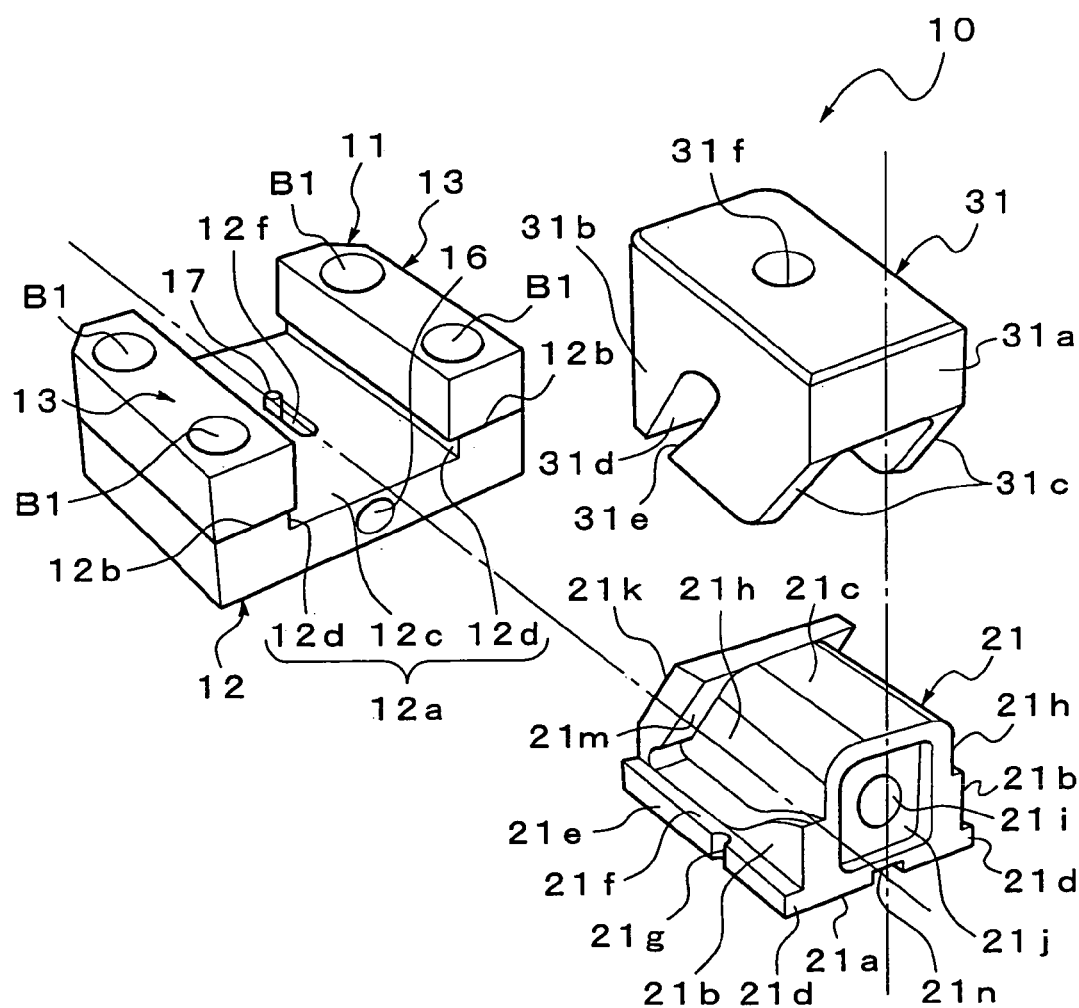
FIG. 1 is an exploded perspective view of a slide core unit in a first embodiment of the present invention.
Figure 2A:
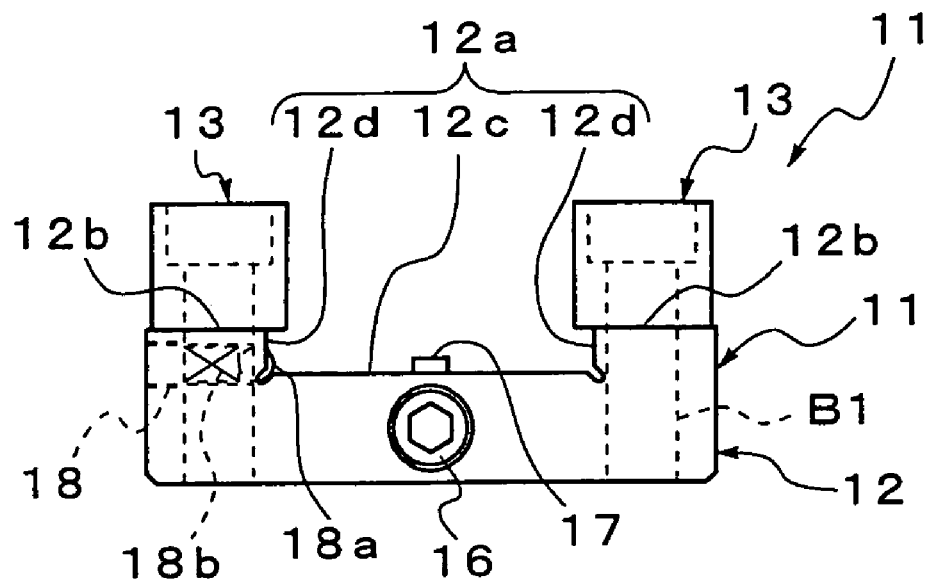
FIG. 2a and FIG. 2b show a guiding member of the slide core unit, wherein FIG. 2a showing a front view and FIG. 2b, a plan.
Figure 2B:
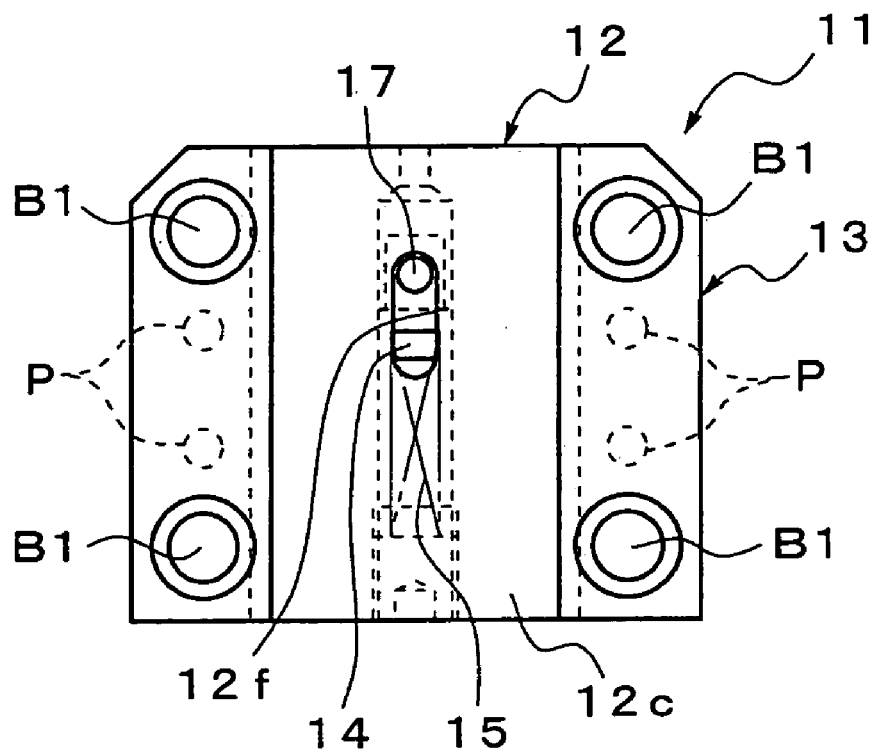
Figure 3A:
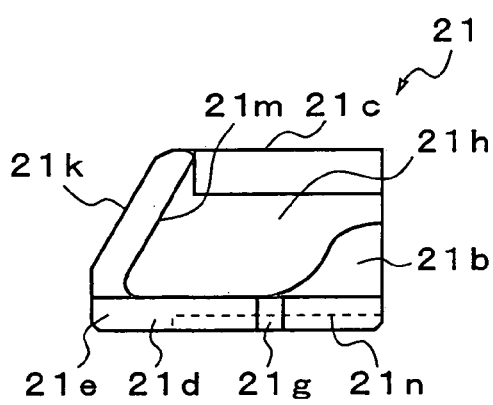
Figure 3B:
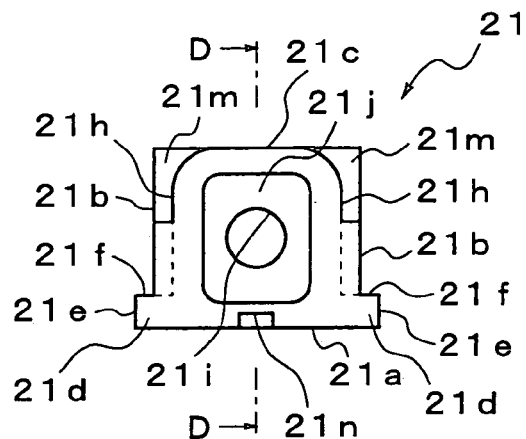
Figure 3C:
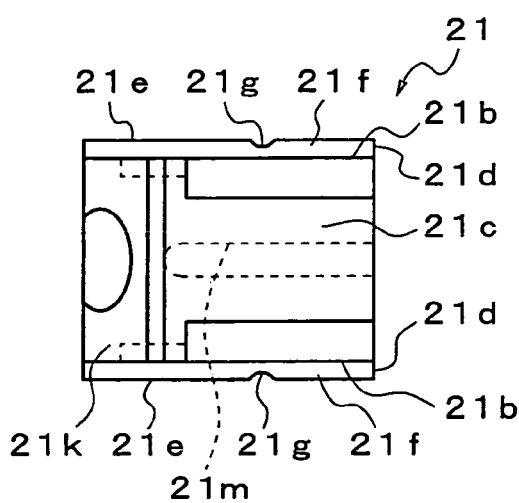
Figure 3D:
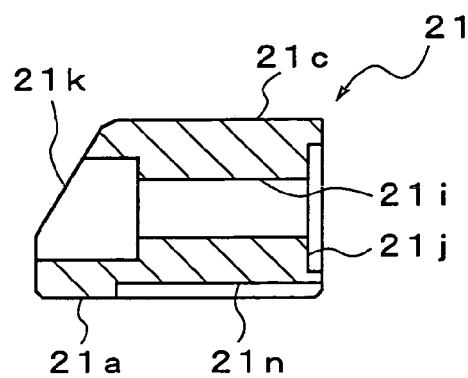
Figure 4A:
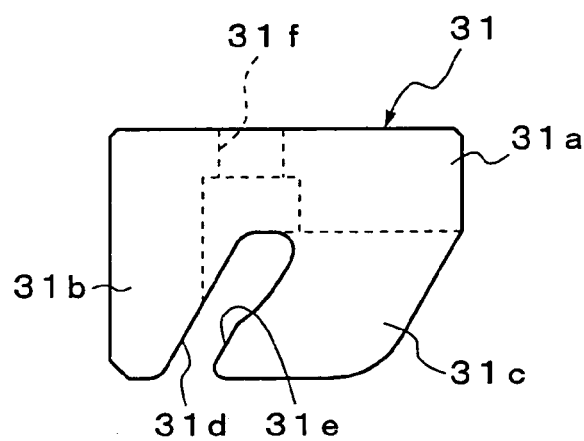
Figure 4B:
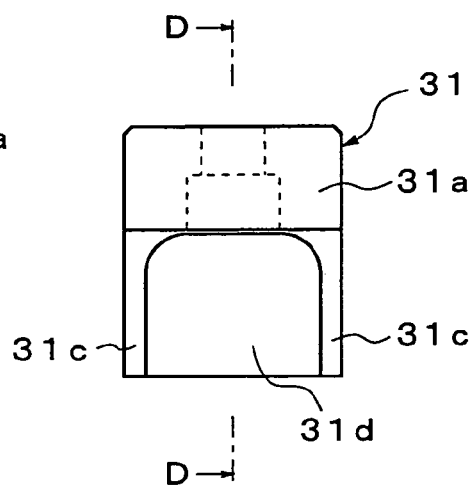
Figure 4C:
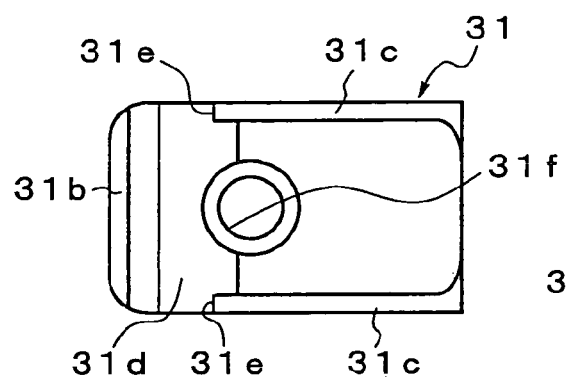
Figure 4D:
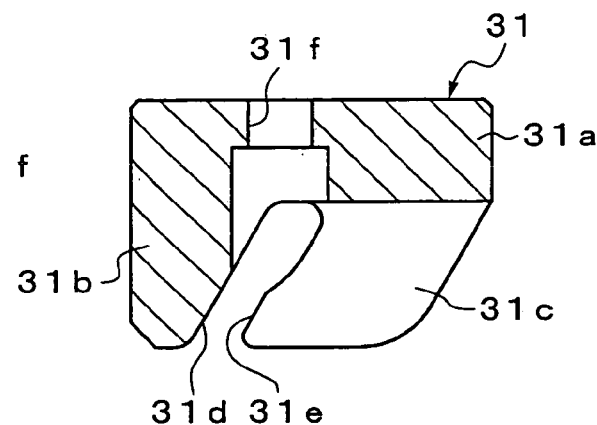

The guiding member 11, as shown in FIG. 1, FIG. 2a and FIG. 2b, has a guide base 12 formed in a quadrangular plate shape and two guide plates 13. The guide base 12 has a rail part 12a formed in a groove shape in one of its face. The rail part 12a is formed between guide stages 12b and 12b rising on the right and left sides of the guide base 12, each having a quadrangular sectional shape, and extending in parallel to each other, and the rail part 12a has a bottom face 12c and inner side faces 12d extending in parallel to each other on the right and left sides of the bottom face 12c. This rail part 12a linearly guides the slide core 21.

Figure 5:
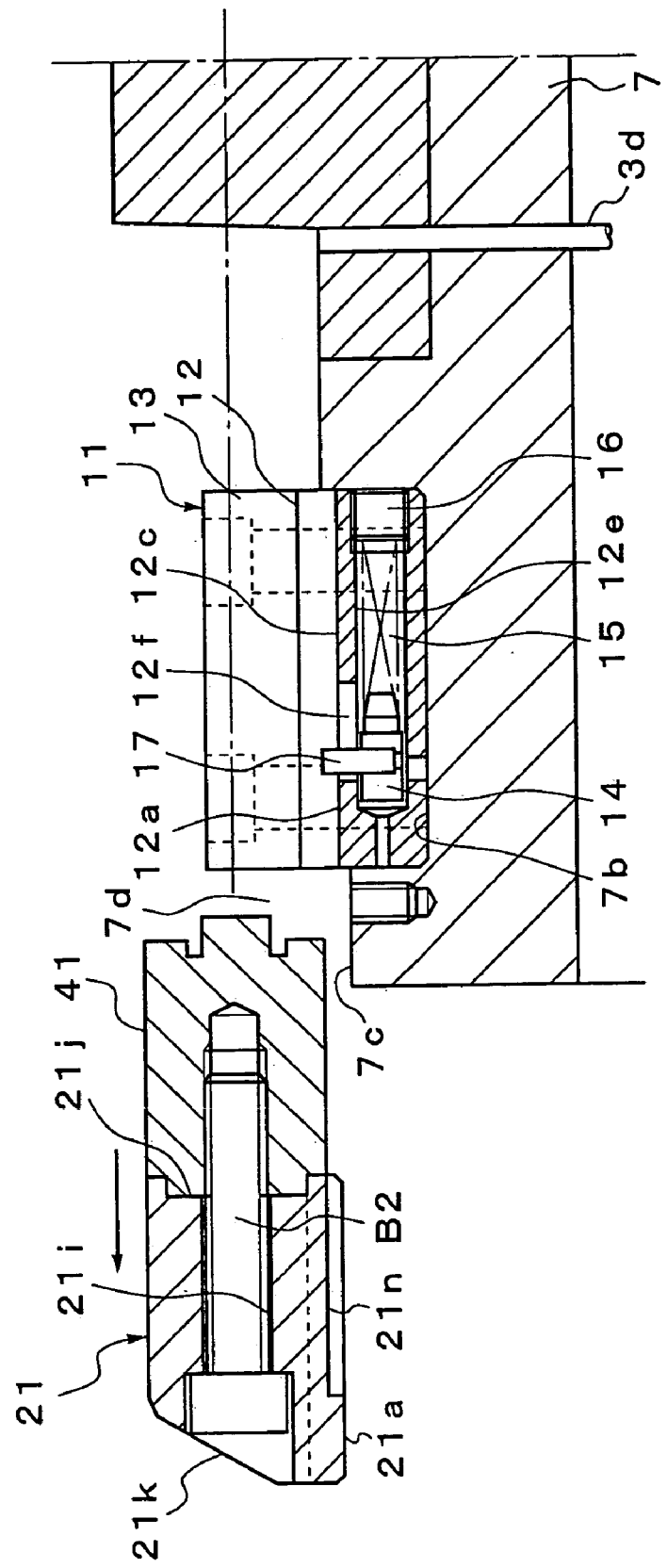
FIG. 5 is a sectional view showing a state in which the slide core is removed from the guiding member in the slide core unit.

Also in the guide base 12 are formed, as shown in FIG. 5, a guide hole 12e linearly extending underneath the bottom face 12c and in the central part of the bottom face 12c in its widthwise direction, and a long hole 12f penetrating from the bottom face 12c to the guide hole 12e (penetrating from within the guide hole 12e to the slide core 21). The guide hole 12e, having a circular sectional shape, is formed in a length spanning the guide base 12 from one end face to the vicinity of the other. The long hole 12f is in the central part of the bottom face 12c in its widthwise direction, and extends in the direction coaxial with the guide hole 12e. The length in which a spring pin 17, to be described afterwards, being inserted into this long hole 12f, can travel within the long hole 12f in the lengthwise direction, is somewhat longer than the stroke S of the slide core 21 moved by an angular cam 31 to be described afterwards.

Figure 6:
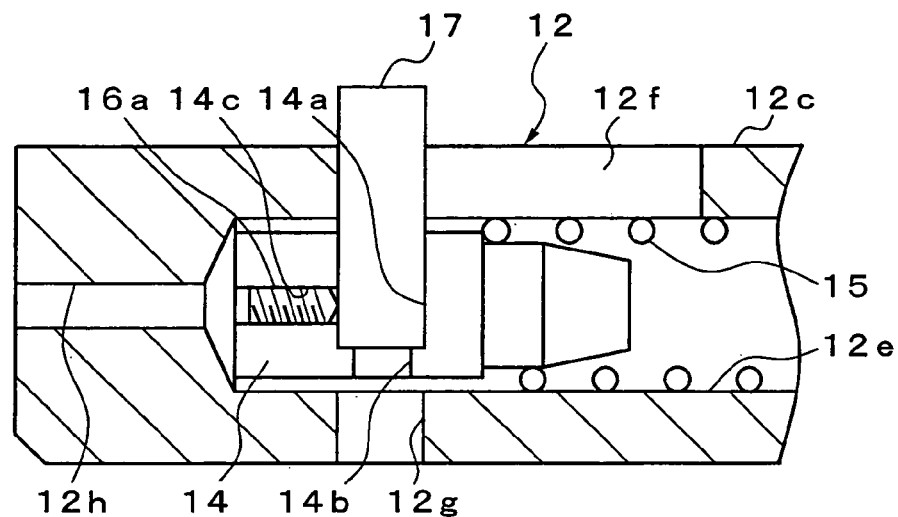
FIG. 6 is a sectional view of the essential part, showing urging means of the slide core unit.
Figure 7A:
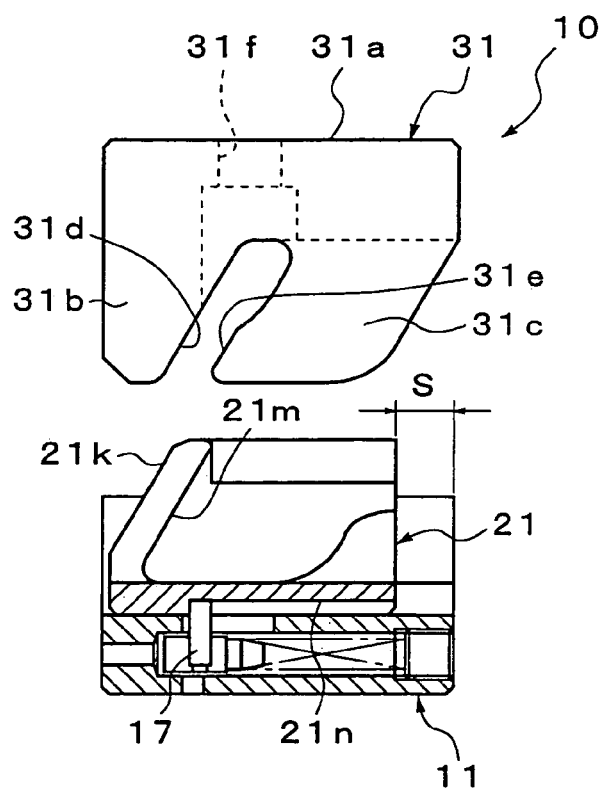
FIG. 7a and FIG. 7b illustrate the principle of the moving of the slide core by the angular cam in the slide core unit, wherein FIG. 7a showing the state before the slide core is driven and FIG. 7b, after the slide core has been driven.
Figure 7B:
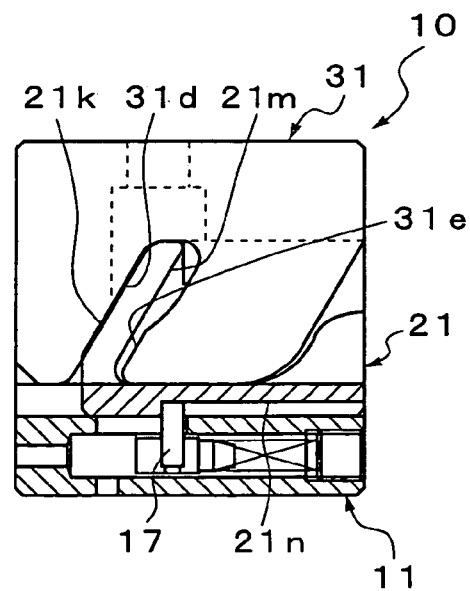

A moving piece 14 is inserted into the guide hole 12e to be movable in the axial direction, and a coil spring (elastic body) 15 to urge the moving piece 14 toward the deepest side is also provided in the guide hole 12e. The coil spring 15 is held in a compressed state by a blind screw 16 blocking the aperture of the guide hole 12e, and urges the moving piece 14 toward the deepest side (in the direction away from the cavity 8a) all the time. In the position of the long hole 12f is also installed, as shown in FIG. 6, a spring pin (pin) 17 which is inserted into this long hole 12f and of which the lower end (base) is fixed to a linking hole 14a of the moving piece 14 and the upper end (tip) protrudes from the bottom face 12c to a prescribed height (protruding toward the slide core 21).

There is provided urging means for urging the slide core 21 in the direction of retreating from the cavity 8a relative to the guiding member 11. The urging means has the guide hole 12e, the long hole 12f, the moving piece 14, the coil spring 15, the blind screw 16 and the spring pin 17.

The linking hole 14a is formed in a prescribed depth from the outer circumferential face of the columnar moving piece 14, and in its bottom is bored an ejection hole 14b having a smaller diameter than that of the linking hole 14a. Further in the guide base 12 is bored a through hole 12g in a position which becomes coaxial with the ejection hole 14b in a state in which the moving piece 14 has been moved by the coil spring 15 to the deepest part of the guide hole 12e.

The spring pin 17 is placed in a state in which it protrudes from the bottom face 12c by a prescribed height by being driven into the linking hole 14a via the long hole 12f, and is removed from the linking hole 14a by being driven out with a rod-shaped jig from the through hole 12g and the ejection hole 14b.

Further in the guide base 12, a through hole 12h spanning the guide base 12 from its other end face to the guide hole 12e is bored coaxially with the guide hole 12e. This through hole 12h is smaller in diameter than the guide hole 12e. Further in the moving piece 14 is formed a threaded hole 14c, extending to orthogonally cross the linking hole 14a, in a position in which this hole 14c becomes coaxial with the through hole 12h in a state in which the moving piece 14 is inserted into the guide hole 12e, and in this threaded hole 14c is provided a stop screw 16a for securely fixing the spring pin 17 into the linking hole 14a.

Incidentally, the through hole 12h enables a jig, such as a screw driver (not shown), to be inserted to turn the stop screw 16a to rotate.

The spring pin 17 can be placed in a state of being linked to the linking hole 14a with sufficient firmness by merely being driven into the linking hole 14a. Therefore, when the spring pin 17 is to be used, the threaded hole 14c, the stop screw 16a and the through hole 12h can be dispensed with, though, when a parallel pin is used instead of the spring pin 17 and this parallel pin is inserted into the linking hole 14a by ordinary loose fit instead of pressure fit, the threaded hole 14c, the stop screw 16a and the through hole 12h are indispensable. Thus, where a parallel pin is used, the parallel pin can be securely fixed into the linking hole 14a with the stop screw 16a.

The guide base 12 is also provided, as shown in FIG. 2a and FIG. 2b, with a ball plunger 18 so arranged that its ball 18a protrudes partly from one of the inner side faces 12d. This ball plunger 18 is embedded into the guide base 12, fixed with a thread formed in the outer circumference of the body and urges the ball 18a in the protruding direction with a coil spring 18b provided within that body. The ball plunger 18 is so disposed that part of the ball 18a protruding from the inner side face 12d can engage with an engaging concave portion 21g, to be described afterwards, of the slide core 21. The engagement of the ball 18a with the engaging concave portion 21g makes the force to inhibit the movement of the slide core 21 slightly greater than the force of the coil spring 15 to drive the slide core 21. The inhibitive force, however, is sufficiently smaller than the force of a fingertip operation by an average person for sliding the slide core 21.

The parts of guide, plates 13 protruding toward the rail part 12a, as shown in FIG. 1, FIG. 2a and FIG. 2b, are enabled to slidably support the upper faces 21f of ribs 21d, to be described afterwards, of the slide core 21 by being fixed to the top faces of the right and left guide stages 12b with bolts B1. These guide plates 13 can function to prevent the slide core 21 from rising above the bottom face 12c of the rail part 12a. The guide stages 12b and the guide plates 13, after being positioned by at least two pins P, such as spring pins and parallel pins, arranged at prescribed intervals in the lengthwise direction, are coupled by the bolts B1.

In the guiding member 11 configured as described above, as shown in FIG. 8 and FIG. 9, the guide base 12 is to be fixed by being fitted into a concave portion 7b formed in the mating face 7a of the movable mold member 7, and the rail part 12a, the guide hole 12e and the long hole 12f are oriented in the direction of moving toward and away from the cavity 8a. Thus the guiding member 11 is to be so fixed to the movable mold member 7 as to guide the slide core 21 toward and away from the cavity 8a.

Between the guiding member 11 in the movable mold member 7 and the outer end of the movable mold member 7, there is a face 7c which is at the same level as or lower than the bottom face 12c of the rail part 12a in the guide base 12 fitted into the concave portion 7b, and there is constituted a space 7d into which the slide core 21 can be inserted.

The slide core 21, as shown in FIG. 1, FIG. 3a through FIG. 3d and FIG. 5, is formed in a substantially quadrangular pole having the bottom face 21a, right and left faces 21b and top face 21c. The quadrangularly shaped bottom face 21a and side end faces 21e of ribs 21d protruding to the right and left of the bottom face 21a are slidably supported by the bottom face 12c and the inner side faces 12d of the rail part 12a. Also, the upper faces 21f of the right and left ribs 21d are slidably supported by the guide plates 13.

Further, in the side end face 21e of the ribs 21d is formed the arcuate engaging concave portion 21g with part of the ball 18a engages with.

Also, the slide core 21 has, in each of the right and left faces 21b a concave portion 21h into which a backward driving cam piece 31c of the angular cam 31 to be described afterwards can be inserted. In the axial center of the slide core 21 is bored a through hole 21i for a bolt B2 for fixing a core part 41, and in its other end face in the axial direction is formed a concave portion 21j for alignment with the core part 41.

Further at the other end of the slide core 21 in its axial direction is formed a forward driven cam face 21k. This forward driven cam face 21k consists of a inclined face from the bottom face 21a side to the top face 21c, gradually positioned toward the core part 41. On the back sides of the right and left side edges of the forward driven cam face 21k are formed backward driven cam faces 21m. These backward driven cam faces 21m are formed by the inner side faces of the concave portion 21h in parallel with the forward driven cam face 21k.

In the bottom face 21a of the slide core 21 is formed a concave portion 21n which engages with the upper end of the spring pin 17 protruding from the bottom face 12c of the guide base 12. This concave portion 21n, located at the center of the bottom face 21a in its widthwise direction, linearly extends from a prescribed position on the forward driven cam face 21k side to reach the end face toward the core part 41.

The slide core 21, configured as described above, is installed in the guiding member 11 in the movable mold member 7, with the core part 41 being fixed by means of the bolt B2 as shown in FIG. 8 and FIG. 9. In this state, the slide core 21 is supported to be movable toward and away from the cavity 8a, and the forward driven cam face 21k, positioned on the base end face of the slide core 21 on the side reverse to the cavity 8a, is so inclined as to be positioned gradually closer to the cavity 8a as it approaches the stationary mold member 6. Further, the slide core 21 is stopped in the standby position farthest away from the cavity 8a as the ball 18a of the ball plunger 18 engages with the engaging concave portion 21g.

To the face 7c of the movable mold member 7 where the slide core 21 is inserted or extracted is fixed a stopper bolt 19 for preventing the slide core 21 from coming off the guide base 12.

On the other hand, the angular cam 31, as shown in FIG. 1, FIG. 4a through FIG. 4d, and FIG. 7a through FIG. 9, is integrally formed of a base portion 31a fixed to the stationary mold member 6, a forward driving cam portion 31b provided at the end in the direction away from the cavity 8a, and the backward driving cam pieces 31c and 31c arranged on the right and left.

The face of the forward driving cam portion 31b toward the cavity 8a constitutes a forward driving cam face 31d. This forward driving cam face 31d is inclined in the same direction as the forward driven cam face 21k of the slide core 21 installed in the movable mold member 7. When closing the mold, the slide core 21 is driven toward the cavity 8a by the stroke S (see FIG. 7a) by sliding the forward driving cam face 31d in contact with the forward driven cam face 21k. In the completely closed state of the mold, the forward driving cam face 31d acts to protrude the tip of the core part 41 to the part corresponding to the undercut B of the molding B in the cavity 8a. In the closed state of the mold, the forward driving cam portion 31b also functions as a locking block to prevent the core part 41 from moving away from the cavity 8a.

On the other hand, the right and left backward driving cam pieces 31c are so formed as to be inserted into the respectively right and left concave portions 21h of the slide core 21 when the mold is to be closed, and the tips of their sides along the forward driving cam face 31d constitute backward driving cam faces 31e. However, since the slide core 21 is urged by urging means in the direction away from the cavity 8a, normally the backward driving cam faces 31e is slightly away from the backward driven cam faces 21m.

In the base portion 31a is bored a through hole 31f through which a bolt B3 is to be inserted. The angular cam 31 is fixed to the stationary mold member 6 by the bolt B3 in a state in which its base portion 31a is fitted into a concave portion 6b of the stationary mold member 6.

In the slide core unit 10 configured as described above, the guiding member 11 is provided for guiding the slide core 21 in the directions toward and away from the cavity 8a, and this guiding member 11 is provided with urging means which, consisting of the guide hole 12e, the moving piece 14, the coil spring 15, the blind screw 16 and the spring pin 17 urges the slide core 21 away from the cavity 8a. Therefore, downsizing of the slide core 21 can be established relative to the slide core according to the prior art having a spring. When the slide core 21 is to be modified or replaced with another core of a different shape, only the slide core 21 needs to be modified or replaced, and nothing pertaining to the urging means or the like needs to be modified or replaced, resulting in a saving in modifying cost or the labor and cost required for redesigning and machining the shape. Therefore the costs of maintenance and manufacture can be reduced.

As the urging means also applies, with the spring pin 17 protruding from the bottom face 12c of the rail part 12a in the guide base 12, urging force to the concave portion 21n of the bottom face 21a in the slide core 21, it can stably slide the slide core 21 along the bottom face 12c with that urging force. Thus, it can securely prevent the movement of the slide core 21 from becoming intermittent or stopping.

Further, as there is provided, between the guide base 12 and the outer end of the movable mold member 7, the space 7d to make possible insertion of the slide core 21, the slide core 21 having the core part 41 can be taken out of the rail part 12a of the guiding member 11 as indicated by an arrow in FIG. 5 in a state in which the mold is open, for instance. Therefore, when the slide core 21 or the core part 41 needs repair, it can be easily done without having to remove the mold 8 from the injection molding machine.

Also as the guiding member 11 is provided with the ball plunger 18 for holding the slide core 21 in the standby position away from the cavity 8a to a prescribed extent, the slide core 21 does not come off the guiding member 11 in a normal opening or closing process, and the slide core 21 can be readily taken off the guiding member 11 by working an external force of not smaller than a prescribed strength. Therefore, since any tool need not be used for attaching the slide core 21 to, or detaching it from, the guiding member 11, there is an advantage of a simplified attaching/detaching procedure.

Incidentally, although the guiding member 11 in the first embodiment of the invention described above consists of the guide base 12 and the guide plates 13 separable from each other, this guiding member 11 can as well consist of the guide base 12 and the guide plates 13 formed integrally. In this case, the rail part 12a is formed in a U shape by wire cutting or otherwise. This integrated structure would provide an advantage of reducing the number of parts corresponding to that integration and of reducing the numbers of such parts as the bolts B1 and the pins P as well.

Figure 10:
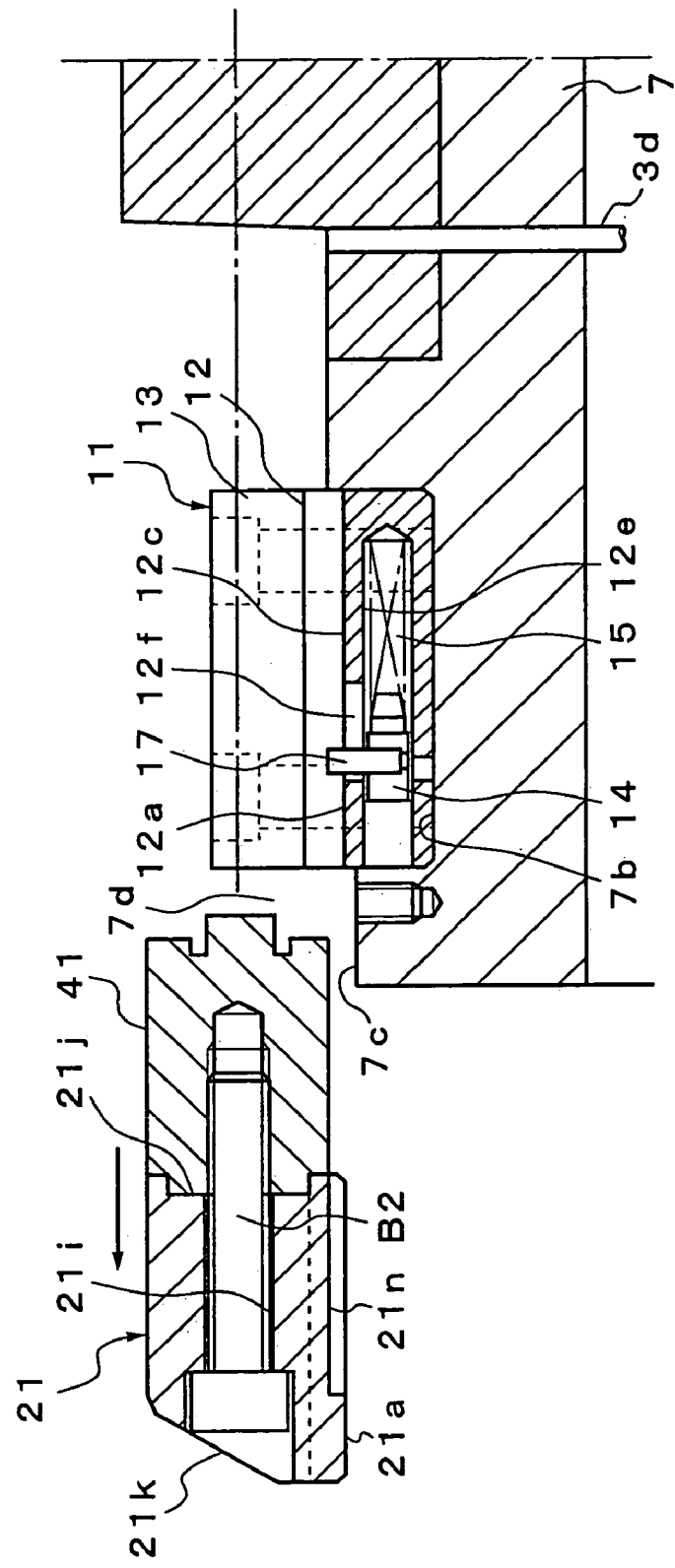
FIG. 10 is a sectional view of another example of guiding member in the slide core unit.
Figure 11:
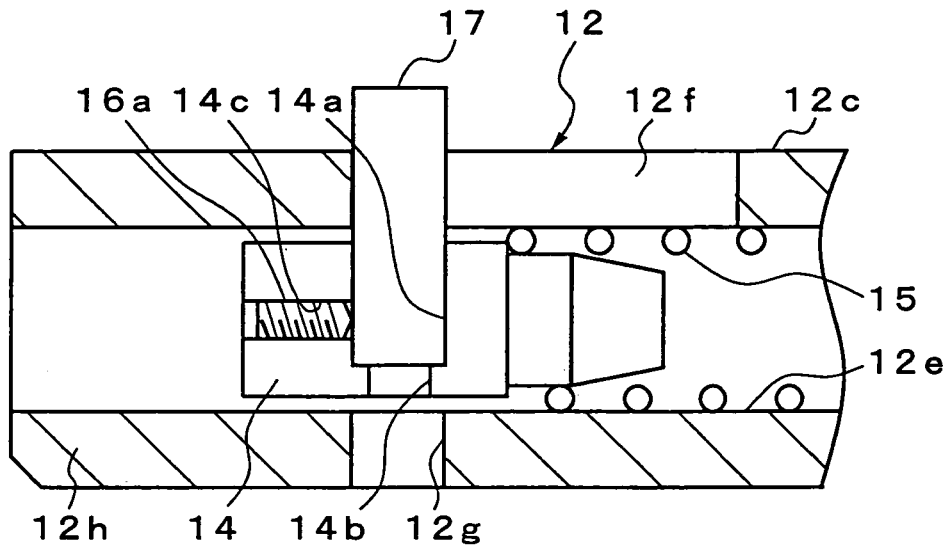
FIG. 11 is an expanded sectional view of the essential part of that another example.

Further, although the guide hole 12e is so formed as to span the guide base 12 from one end face to the vicinity of the other end face, this guide hole 12e may as well span the guide base 12 from that second end face to the vicinity of the first end face as shown in FIG. 10 and FIG. 11.

In this latter case, not only can the moving piece 14 be inserted into the guide hole 12e from the second end face but also can a jig, such as a screw driver, be inserted from that second end face to tighten the stop screw 16a (see FIG. 11), and accordingly there is an advantage that the blind screw 16 and the through hole 12h mentioned above can be dispensed with, resulting in a corresponding cost saving.

Second Embodiment

Next will be described a second embodiment of the present invention with reference to FIG. 12 through FIG. 16b. Constituent elements in common with the first embodiment are denoted by respectively the same reference signs, and their description will be simplified.

A slide core unit 10A in this embodiment is so configured that a slide core 21A is provided with urging means for urging the slide core 21A onto the guiding member 1A in the direction away from the cavity 8a.

Figure 13A:
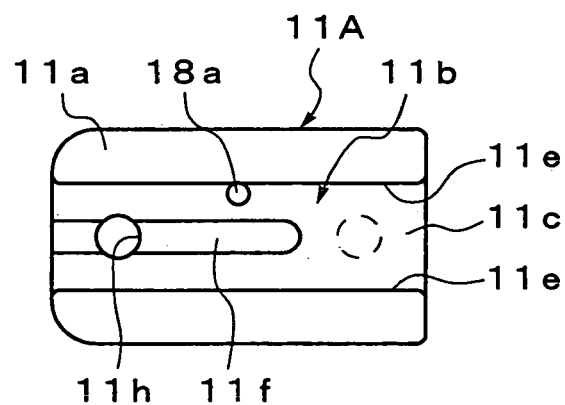
Figure 13B:
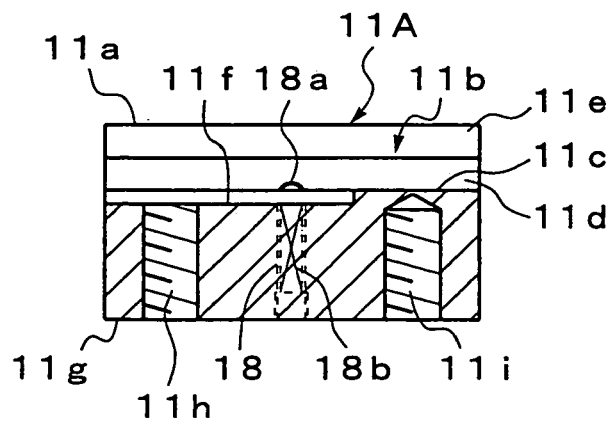
Figure 12:
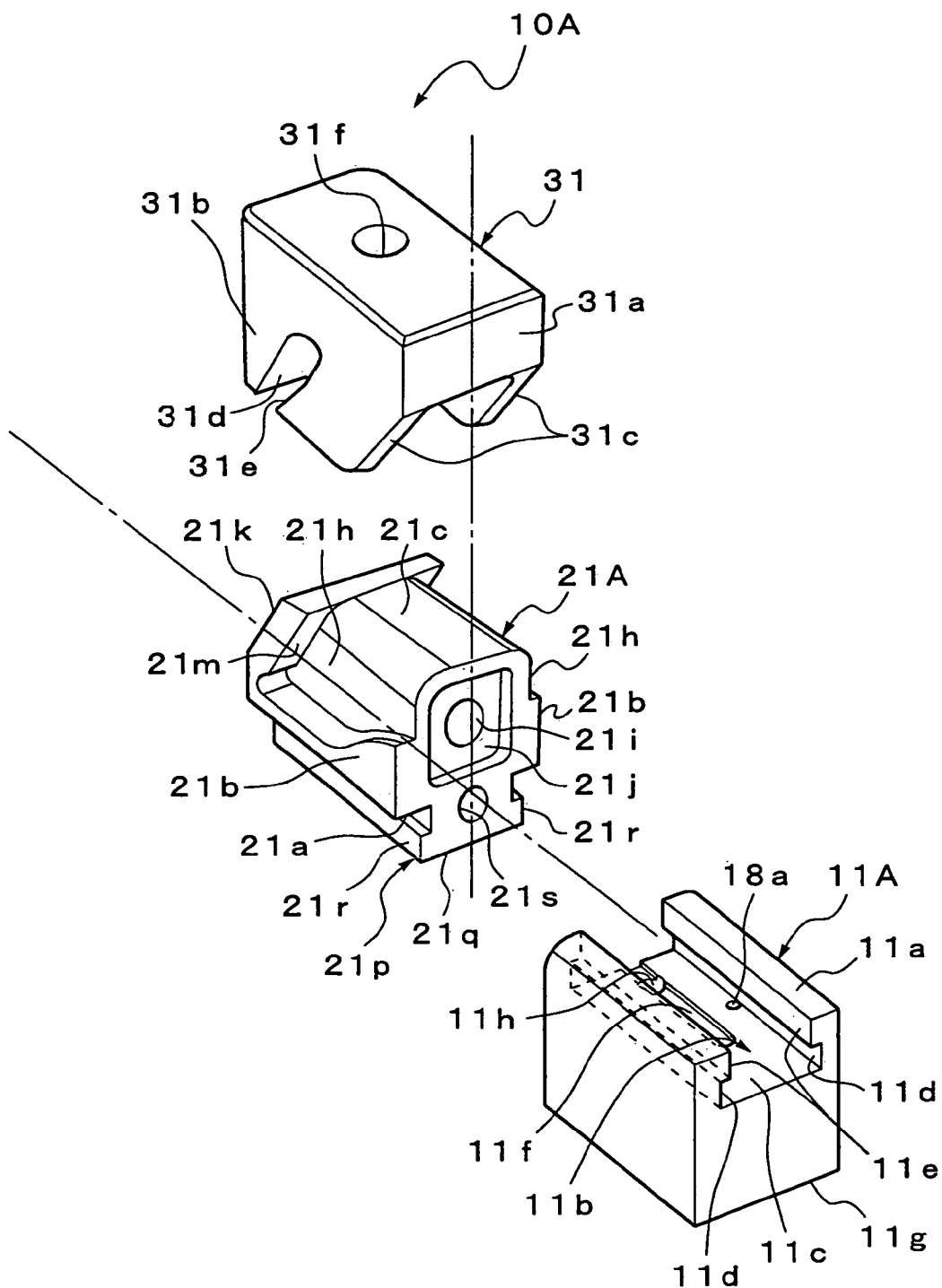
FIG. 12 is an exploded perspective view of a slide core unit in a second embodiment of the present invention.
Figure 14A:
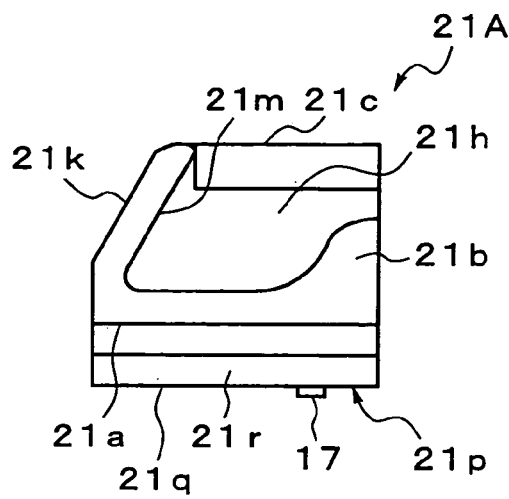
Figure 14B:
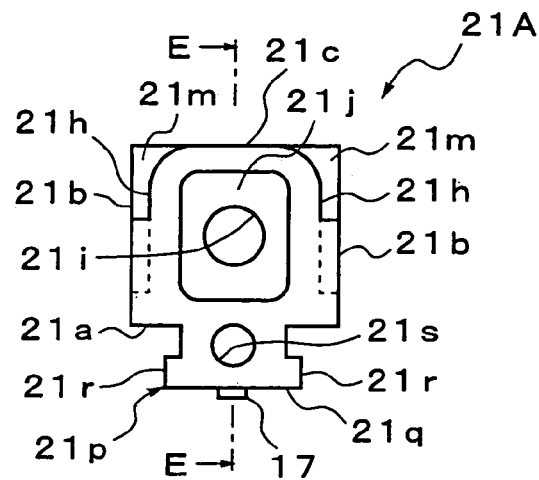
Figure 14C:
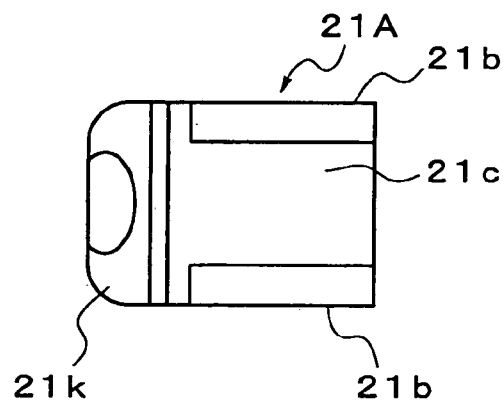
Figure 14D:
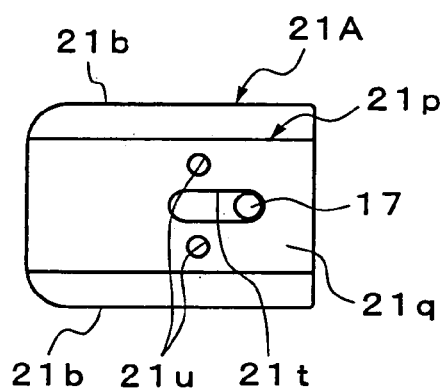
Figure 14E:
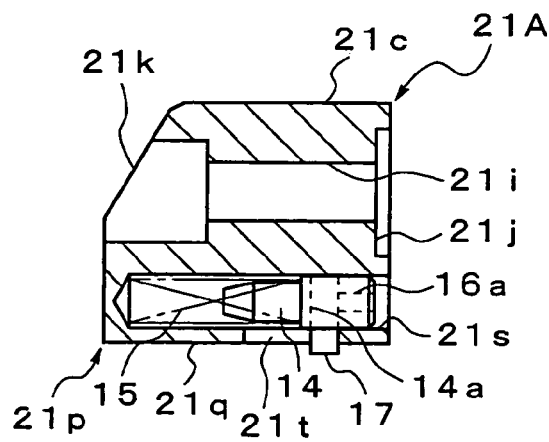

The guiding member 11A is formed in a quadrangular pole as shown in FIG. 12, FIG. 13a and FIG. 13b, and in a top face 11a, which is one of its faces, is formed a groove-shaped rail portion 11b linearly extending in the axial direction. The rail portion 11b has inner side faces 11d rising vertically from both ends of the bottom face 11c, formed in a planar shape, in the width direction, and on the parts along the top face 11a in the inner side faces 11d are formed protruding strips 11e protruding inside toward each other and each having a rectangular section. The bottom face 11c of the rail portion 11b is formed in parallel with the top face 11a.

In the bottom face 11c of the rail portion 11b is formed a concave portion 11f which engages with the tip of the spring pin 17 protruding from the bottom end face 21q, to be described afterwards, of the slide core 21A. This concave portion 11f positioned in the central part of the bottom face 11c in the widthwise direction, is formed of a groove linearly extending from one end face toward the other end face of the guiding member 11A. The other end functions as a stopper to stop the spring pin 17 by engagement.

Further, the guiding member 11A is provided, as shown in FIG. 13a and FIG. 13b, with a ball plunger 18 so arranged as to have part of a ball 18a protrude from the bottom face 11c. The ball 18a protrudes toward one side of the linearly extending concave portion 11f and engages with an engaging concave portion 21u of the slide core 21A to be described afterwards.

The ball 18a also functions to inhibit the slide core 21A from moving by engaging the engaging concave portion 21u, and its inhibitive force is slightly greater than the force to drive the slide core 21A with the coil spring 15 to be described afterwards, though sufficiently smaller than the force by which an average person can slide the slide core 21A with his or her finger.

Further in the guiding member 11A are formed two screw holes 11h and 11i extending from the bottom face 11g, which is another face positioned opposite the top face 11a, toward the bottom face 11c of the rail portion 11b. These screw holes 11h and 11i are used for fixing the guiding member 11A itself into the concave portion 7b of the movable mold member 7 with bolts. One screw hole 11h penetrates the bottom face 11c, while the other screw hole 11i is discontinued without reaching the bottom face 11c. The former screw hole 11h functions as a screw hole for use in removing from the concave portion 7b of the movable mold member 7 with the guiding member 11A in a state of being fitted into the concave portion 7b.

The guiding member 11A configured as described above, as shown in FIG. 15, is fitted into the concave portion 7b formed in the mating face 7a of the movable mold member 7, and fixed to the movable mold member 7 with bolts (not shown) screwed into the screw holes 11h and 11i. In this fixed state, the other end face of the guiding member 11A is positioned toward the cavity 8a, and the rail portion 11b and the concave portion 11f extend in the direction of moving toward or away from the cavity 8a. Thus, the guiding member 11A is fixed to the movable mold member 7 to guide the slide core 21A in the direction of moving toward or away from the cavity 8a.

The slide core 21A, as shown in FIG. 12 and FIG. 14a through FIG. 16b, is formed in a substantially quadrangular pole having the bottom face 21a, the right and left faces 21b and the top face 21c, though it is not provided with the ribs 21d (see FIG. 3b) mentioned above, and instead is provided with, underneath the bottom face 21a, a guided portion 21p which engages with the rail portion 11b of the guiding member 11A.

This guided portion 21p has a bottom end face 21q which slides along the bottom face 11c of the rail portion 11b, and further has engaged portions 21r extending from both ends of this bottom end face 21q in the widthwise direction and formed along the inner side faces 11d and the protruding strips 11e of the rail portion 11b.

In the slide core 21A, there are also formed a guiding hole 21s linearly extending in the central part of the guided portion 21p in the widthwise direction along the axis and a long hole 21t penetrating the bottom end face 21q from within the guiding hole 21s (that is, penetrating from the guiding hole 21s toward the guiding member 11A). The guiding hole 21s, having a circular sectional shape, is formed to span the slide core 21A from one end face to the vicinity of the other end face. The long hole 21t, positioned at the center of the bottom end face 21q in its widthwise direction, extends in the direction coaxial with the guiding hole 21s.

The guiding hole 21s is inserted into the moving piece 14 to be movable in the axial direction, and is provided with a coil spring (elastic body) 15 to urge the moving piece 14 toward the opening side of the guiding hole 21s (toward the cavity 8a). Into the long hole 21t is inserted a spring pin (pin) 17 of which the base end is fixed to the linking hole 14a of the moving piece 14 and the tip protrudes from the bottom end face 21q by a prescribed length. The coil spring 15 is held in a compressed state by the bottom of the guiding hole 21s and the moving piece 14 when the movement of the moving piece 14 is stopped by the engagement of the spring pin 17 with one end (the end toward the cavity 8a) of the long hole 21t, thereby urges the moving piece 14 toward the opening side of the guiding hole 21s all the time.

Incidentally, the guiding hole 21s, the long hole 21t, the moving piece 14, the coil spring 15 and the spring pin 17 constitute urging means which urges the slide core 21A relative to the guiding member 11A in the direction of retreating from the cavity 8a. The length by which the spring pin 17, to be described afterwards, inserted into the long hole 21t can move in the long hole 21t in the lengthwise direction is slightly longer than the stroke S of the slide core 21A (see FIG. 16a) moved by the angular cam 31.

In the bottom end face 21q of the slide core 21A are formed engaging concave portions 21u to engage with the ball 18a protruding from the bottom face 11c of the rail portion 11b. These engaging concave portions 21u are so positioned that one of them is engaged with the ball 18a in a state in which one end of the guided portion 21p of the slide core 21A in the axial direction is inserted into one end of the rail portion 11b of the guiding member 11A in the axial direction, the spring pin 17 is engaged with the other end of the concave portion 11f and the spring pin 17 is engaged with one end of the long hole 21t. The engaging concave portions 21u are located in the corresponding opposite sides of the linearly extending concave portion 11f, and engages with the ball 18a of the ball plunger 18 on whichever side of the extending concave portion 11f the ball plunger 18 may be positioned.

Figure 15:
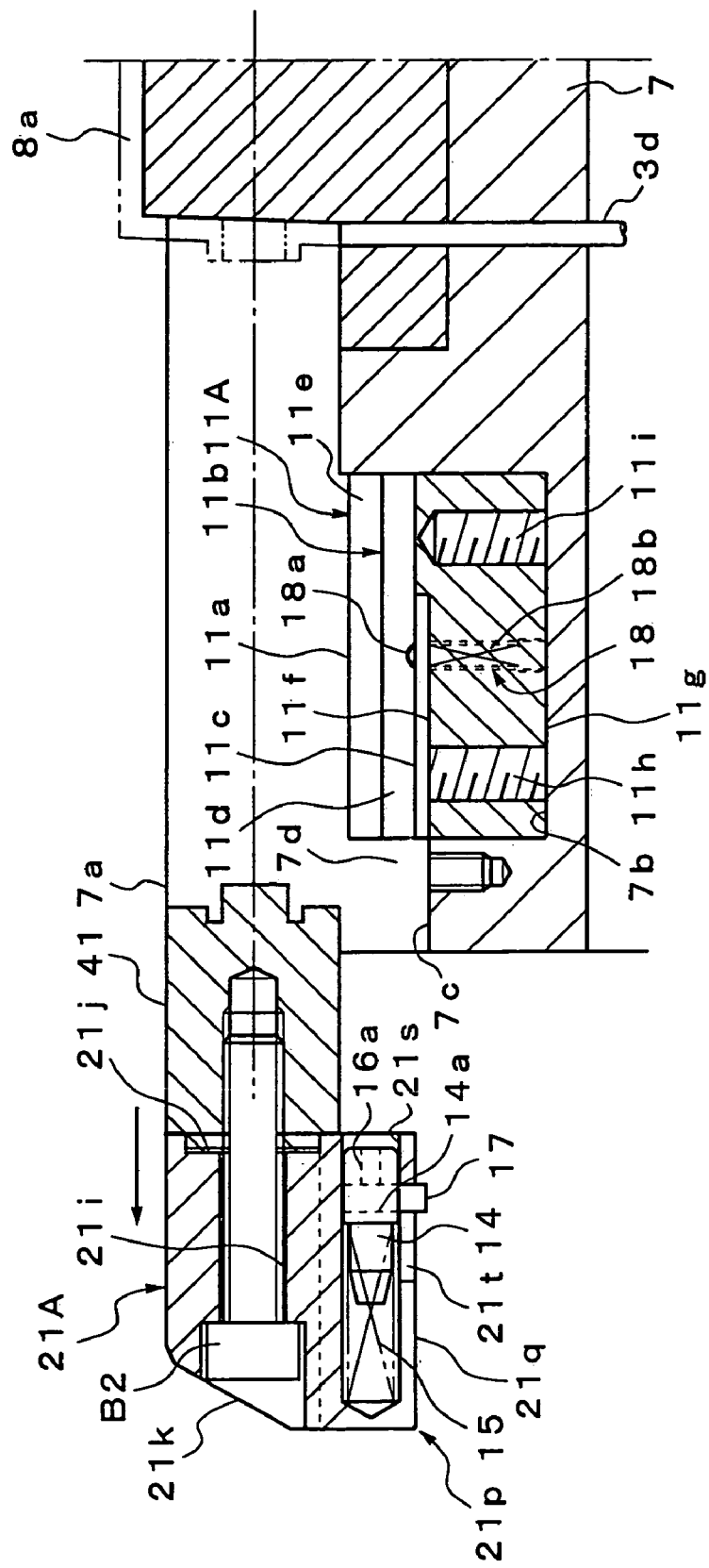
FIG. 15 is a sectional view showing a state in which the slide core is removed from the guiding member in the slide core unit.

The slide core 21A configured as described above, with its core part 41 fixed with the bolt B2 is installed in the guiding member 11A in the movable mold member 7 as shown in FIG. 15. When it is installed, with the core part 41 being directed toward inside the movable mold member 7, the guided portion 21p is inserted into the rail portion 11b of the guiding member 11A. Then almost as soon as the tip of the spring pin 17 engages with the other end of the concave portion 11f, the engaging concave portion 21u engages with the ball 18a. This results in a state in which the slide core 21A is held in the standby position, farthest away from the cavity 8a.

In this state, the slide core 21A is supported to be movable in the direction toward or away from the cavity 8a, while the forward driven cam face 21k is positioned at the base end of the slide core 21A on the opposite side of the cavity 8a and inclined to be positioned gradually toward the cavity 8a as it approaches the stationary mold member 6 (see FIG. 9).

Figure 16A:
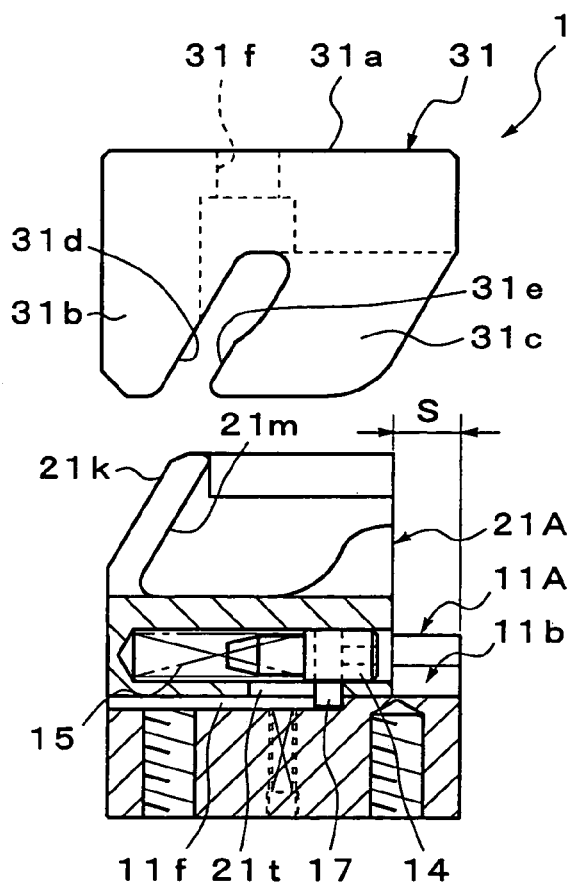
FIG. 16a and FIG. 16b illustrate the principle of the moving of the slide core by the angular cam in the slide core unit, wherein FIG. 16a showing the state before the slide core is driven and FIG. 16b, showing the state after the slide core has been driven.
Figure 16B:
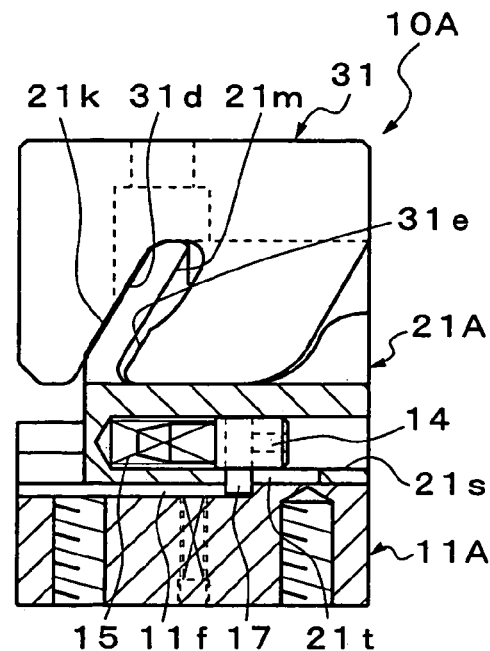

In the slide core unit 10A configured as described above, when the movable mold member 7 (see FIG. 15) is moved from the open state of FIG. 16a to the closed state of FIG. 16b, the forward driving cam face 31d of the angular cam 31 comes into contact with the forward driven cam face 21k of the slide core 21A to thereby move the slide core 21A toward the cavity 8a (see FIG. 15) by the stroke S. Since the tip of the spring pin 17 is kept at halt by its engagement with the other end of the concave portion 11f, the coil spring 15 undergoes compressive deformation as the slide core 21A moves toward the cavity 8a.

When the movable mold member 7 moves from the closed state of FIG. 16b to the open state of FIG. 16a, the elastic force of the coil spring 15 moves the slide core 21A in the direction away from the cavity 8a, and the engagement of one of the engaging concave portions 21u with the ball 18a of the ball plunger 18 stops the slide core 21A from moving farther. When this takes place, the spring pin 17 comes into contact with one end of the long hole 21t. Therefore, in a state in which one of the engaging concave portions 21u is engaged with the ball 18a, the elastic force of the coil spring 15 does not work on the engaging part between the engaging concave portion 21u and the ball 18a. This is also true of the first embodiment.

Therefore, the same effect is provided in the second embodiment as in the first embodiment. In addition, the overall size of the slide core unit 10A provided with the slide core 21A, the guiding member 11A and the urging means can be reduced because the guided portion 21p of the slide core 21A can be used as the space of accommodating the urging means.

Figure 17:
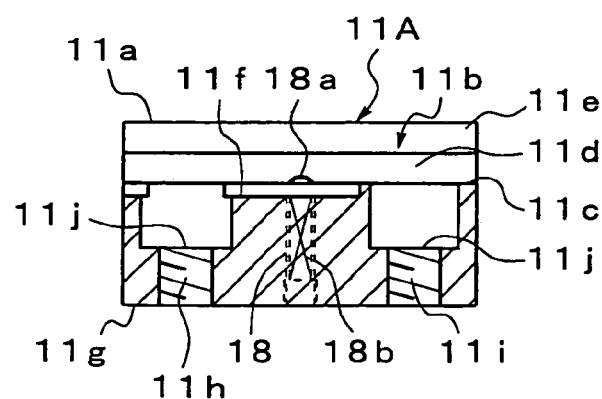
FIG. 17 is a sectional view of another example of guiding member in the slide core unit.
Figure 19A:
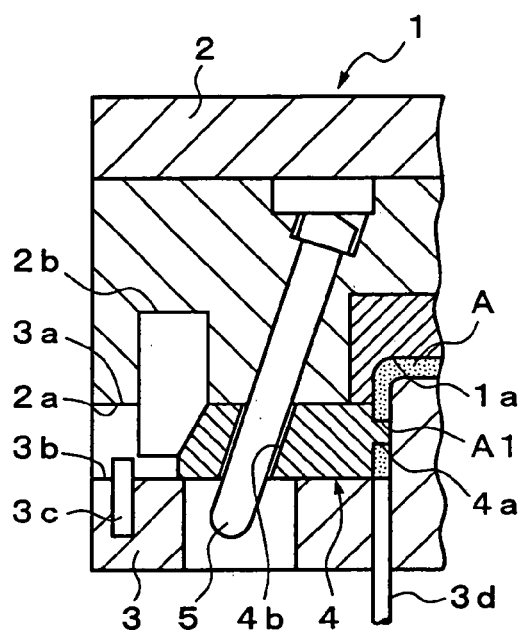
Figure 19B:
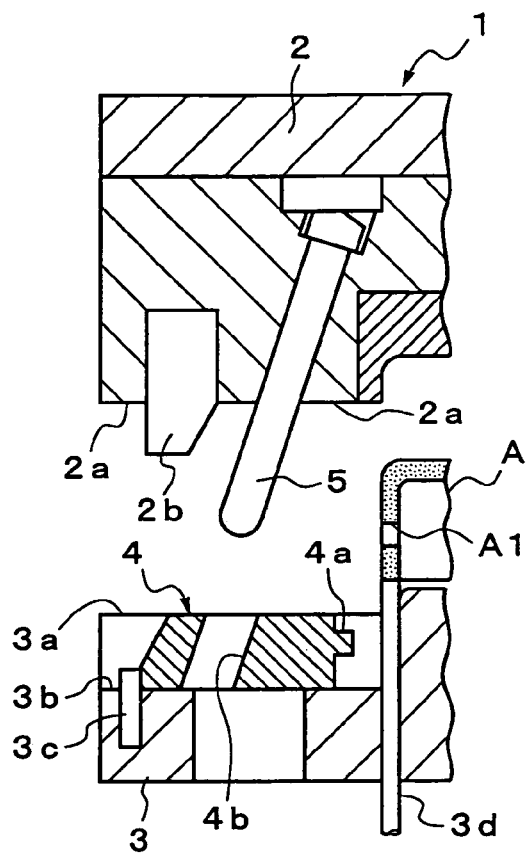
Figure 20:
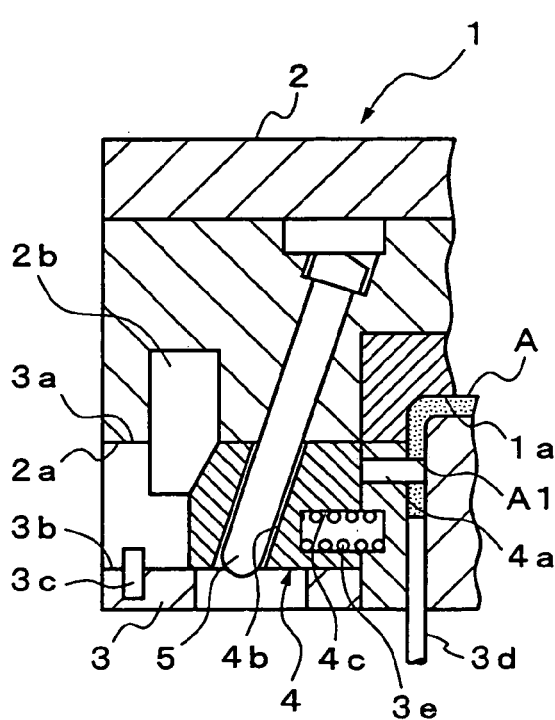
FIG. 20 is a sectional view of a slide core unit cited as another example of the prior art.

Incidentally, while the guiding member 11A is configured to be fixed to the movable mold member 7 by screwing bolts into the screw holes 11h and 11i from underneath the movable mold member 7 according to the foregoing description, this guiding member 11A may as well be fixed to the movable mold member 7 by screwing second bolts into screw holes (not shown) of the movable mold member 7 from above the guiding member 11A as shown in FIG. 17.

Thus, the guiding member 11A may as well be provided with facing holes 11j and 11j opening in the bottom face 11c of the rail portion 11b over the screw holes 11h and 11i, and be fixed to the movable mold member 7 with the second bolts inserted to engage their heads with these facing holes 11j. In this case, the diameter of the threaded portions of the second bolts would be smaller than that of the screw holes 11h and 11i so that the second bolts could move within the screw holes 11h and 11i in the axial direction, and each of the facing holes 11j would have a right size to accommodate the head of each second bolt.

The above-described configuration enables the guiding member 11A to be attached to and detached from the mating face 7a side of the movable mold member 7. Since it is therefore possible to replace the guiding member 11A without having to remove the mold 8 from the injection molding machine, the efficiency of molding can be improved. Further, as the guiding member 11A can as well be fixed to the movable mold member 7 by screwing bolts into the screw holes 11h and 11i from underneath, the freedom of fixing the guiding member 11A to the movable mold member 7 can be increased.

The meshing structure between the slide core 21 or 21A and the angular cam 31 with reference to the first or second embodiments, respectively, may as well be configured as illustrated in FIG. 18a and FIG. 18b. Thus, the slide core 21 or 21A can have a concave groove 21v formed slantwise, and the angular cam 31 may have a protruding strip 31g which can be inserted into and have a shape matching the concave groove 21v.

In this case, the concave groove 21v extends in the direction perpendicularly penetrating the sheet of FIG. 18a and FIG. 18b, and one of its mutually opposite faces (the face toward the cavity 8a (see FIG. 15)) constitutes the forward driven cam face 21k and the other face constitutes the backward driven cam face 21m. The forward driven cam face 21k and the backward driven cam face 21m are inclined to be gradually positioned toward the cavity 8a as they approach the stationary mold member 6 (see FIG. 9).

On the other hand, the protruding strip 31g, like the concave groove 21v, extends in the direction perpendicularly penetrating the sheet of FIG. 18a and FIG. 18b, and one of its fades in a back-to-back opposed relation with each other constitutes the forward driving cam face 31d while the other constitutes the backward driving cam face 31e. Further in FIG. 18a and FIG. 18b, reference numeral 21x denotes screw holes bored in the slide core 21 or 21A to be used for fixing the slide core 21 or 21A to the movable mold member 7, and reference numeral 31h, a screw hole bored in the angular cam 31 to be used for fixing the angular cam 31 to the stationary mold member 6.

In the above-described version of slide core unit 10 or 10A having the concave groove 21v and the protruding strip 31g, when the movable mold member 7 is moved from the open state of FIG. 18a to the closed state of FIG. 18b, the forward driving cam face 31d of the angular cam 31 comes into contact with the forward driven cam face 21k of the slide core 21 or 21A, and causes the slide core 21 or 21A to move toward the cavity 8a by the stroke S. Or when the movable mold member 7 moves from the state of FIG. 18b to that of FIG. 18a, while the forward driving cam face 31d and the forward driven cam face 21k keep the state of being in contact with each other, the elastic force of the coil spring 15 in the urging means described above causes the slide core 21 or 21A to move in the direction away from the cavity 8a. Incidentally, where no urging means is provided, the backward driving cam face 31e of the angular cam 31 comes into contact with the backward driven cam faces 21m of the slide core 21 or 21A to cause the slide core 21 or 21A to move in the direction away from the cavity 8a.

As in the version of slide core unit 10 or 10A configured as described the structures of the concave groove 21v and the protruding strip 31g are very simple and compact, the slide core 21 or 21A and the angular cam 31 can be simplified and reduced in size.

INDUSTRIAL APPLICABILITY

As heretofore described, according to the invention, since the guiding means for guiding the slide core in the forward and backward directions is disposed on a mold member, even if the movements of the slide core have worn off the guiding means, only the guiding means will need to be replaced but not the mold member on which the guiding means is disposed. Accordingly, the maintenance cost of the mold can be reduced.

According to the invention, since the slide core can be urged with respect to the guiding means in the direction away from the molding space via the pin protruding from one member out of the slide core and the guiding means toward the other member, eventually an elastic force will work along the part where the slide core and the guiding means slide relative to each other. Accordingly, the slide core can be moved stably backward.

According to the invention, since the slide core is provided with urging means for urging the slide core in the backward direction with respect to the guiding means, it is possible to simplify and reduce the size of the structure of the guiding means. Accordingly, the cost of maintenance required for replacing the guiding means can be reduced.

According to the invention, though the moving piece disposed in the guide hole is urged toward the molding space by the elastic force of the elastic body, as the tip of the pin is engaged with the concave portion of the guiding means, the slide core is urged in the direction away from the molding space by the reactionary force in which the concave portion is to be a fulcrum. In this case again, since the elastic force works via the pin along the part where the slide core and the guiding means slide relative to each other, the slide core can be moved stably backward.

According to the invention, since there is disposed guiding means for guiding the slide core in the forward and backward directions and this guiding means is provided with urging means for urging the slide core in the backward direction, the slide core can be reduced in size compared with the prior art according to which the slide core is provided with a spring. Moreover, since there is no need to bore a hole in which to embed the spring, the machining of the slide core can be simplified correspondingly. Therefore, the manufacturing cost can be reduced, and at the same time the cost of maintenance required for replacing the slide core can be reduced.

According to the invention, since the urging means comprises a guide hole bored in the guiding means, a moving piece disposed in the guide hole to be movable in the forward and backward directions, an elastic body for urging the moving piece in the backward direction, a long hole penetrating from inside the guide hole toward the slide core, and a pin which is inserted into the long hole and of which the base end is fixed to the moving piece and the tip protrudes toward the slide core, wherein the tip of the pin is engaged with a concave portion in the slide core, the elastic force working from the elastic body on the moving piece can be brought to work on the slide core via the pin to move the slide core in the direction away from the molding space. In this case again, since the elastic force works via the pin along the part where the slide core and the guiding means slide relative to each other, the slide core can be moved stably backward.

According to the invention, since a space through which the slide core can be inserted is provided between the rail portion movably supporting the slide core in the guiding means and the outer end of the mold member, the slide core can be taken out of the rail portion in the guiding means in a state in which, for instance, the mold is opened. Therefore, when the slide core and the core part fitted to the slide core, for instance, need repair or replacement, the repair or replacement can be easily accomplished without having to remove the mold from the injection molding machine or the like.

According to the invention, since one of the slide core and the guiding means has a ball plunger for holding the slide core in its standby position away from the molding space to a prescribed extent with a greater force than the urging force of the urging means, the slide core does not come off the guiding means in normal opening or closing process, and the slide core can be taken off the guiding means by applying an external force greater than a prescribed magnitude. Therefore, because there is no need to use a tool for attaching the slide core to the guiding means or detaching the former from the latter, there is an advantage that the work to attach or detach the slide core is simplified.

The invention claimed is:

1. A slide core unit to be installed in a mold configured to be openable and closable and having at least a pair of mold members which form a molding space when in a closed state, wherein said slide core unit comprises:

a slide core disposed to be movable in forward and backward directions toward and away from said molding space and driven in a forward direction toward said molding space at least in response to a closing action of said mold; and guiding means installed on at least one of said mold members and supporting said slide core to be movable in the forward and backward directions toward and away from said molding space, and one member out of said slide core and said guiding means is provided with urging means for urging said slide core relative to said guiding means in a backward direction away from said molding space, said urging means comprising a guide hole bored in said one member and extending in the forward and backward directions, a moving piece provided in said guide hole to be movable in the forward and backward directions, an elastic body provided in said guide hole and giving an elastic force to said moving piece, a long hole penetrating the other member, different from said one member, out of said slide core and said guiding means from within said guide hole and formed long in the forward and backward directions, and a pin which is inserted into said long hole and of which the base end is fixed to said moving piece and the tip protrudes toward said other member, and said other member is provided with a concave portion with which the tip of said pin is to engage, and said elastic body is disposed within said guide hole to urge said slide core in the backward direction with an elastic force working via said moving piece.

2. A slide core unit to be installed in a mold configured to be openable and closable and having at least a pair of mold members which form a molding space when in a closed state, wherein said slide core unit comprises:

a slide core disposed to be movable in forward and backward directions toward and away from said molding space and driven in a forward direction toward said molding space at least in response to a closing action of said mold; and guiding means installed on at least one of said mold members and supporting said slide core to be movable in the forward and backward directions toward and away from said molding space, and said slide core is provided with urging means for urging said slide core relative to said guiding means in a backward direction away from said molding space, said urging means comprising a guide hole bored in said slide core and extending in the forward and backward directions, a moving piece disposed in said guide hole to be movable in the forward and backward directions, an elastic body disposed in said guide hole to urge said moving piece in the forward direction toward said molding space, a long hole penetrating from inside said guide hole toward said guiding means and formed long in the forward and backward directions and a pin which is inserted into said long hole and of which the base end is fixed to said moving piece and the tip protrudes toward said guiding means, and said guiding means is provided with a concave portion with which the tip of said pin is to engage.

3. A slide core unit to be installed in a mold configured to be openable and closable and having at least a pair of mold members which form a molding space when in a closed state, wherein said side core unit comprises:

a slide core disposed to be movable in forward and backward directions toward and away from said molding space and driven in a forward direction toward said molding space at least in response to a closing action of said mold; and guiding means installed on at least one of said mold members and supporting said slide core to be movable in the forward and backward direction toward and away from said molding space, and said guiding means is provided with urging means for urging said slide core relative to the guiding means in a backward direction away from said molding space, said urging means comprising a guide hole bored in said guiding means and extending in the forward and backward directions, a moving piece disposed in said guide hole to be movable in the forward and backward directions, an elastic body disposed in said guide hole to urge said moving piece in the backward direction, a long hole penetrating from inside said guide hole toward said guiding means and formed long in the forward and backward directions, and a pin which is inserted into said long hole and of which the base end is fixed to said moving piece and the tip protrudes toward said slide core, and said slide core is provided with a concave portion with which the tip of said pin is to engage.

4. The slide core unit according to claim 3, wherein said mold member on which said guiding means is to be disposed is provided with a space between a rail portion movably supporting the slide core disposed in said guiding means and an outer end of the mold member to thereby permit said slide core to be inserted into said space.

5. The slide core unit according to claim 4, wherein one of said slide core and said guiding means has a ball plunger for holding said slide core in its standby position away from said molding space to a prescribed extent with a greater force than an urging force of said urging means.

6. The slide core unit according to claim 3, wherein one of said slide core and said guiding means has a ball plunger for holding said slide core in its standby position away from said molding space to a prescribed extent with a greater force than an urging force of said urging means.

7. A slide core unit to be installed in a mold configured to be openable and closable and having at least a pair of mold members which form a molding space when in a closed state, wherein said side core unit comprises:

a slide core disposed to be movable in forward and backward directions toward and away from said molding space and driven in a forward direction toward said molding space at least in response to a closing action of said mold;

guiding means installed on at least one of said mold members and supporting said slide core to be movable in the forward and backward direction toward and away from said molding space, and said guiding means is provided with urging means for urging said slide core relative to the guiding means in a backward direction away from said molding space, and one of said slide core and said guiding means has a ball plunger for holding said slide core in its standby position away from said molding space to a prescribed extent with a greater force than an urging force of said urging means.

8. The slide core unit according to claim 2, wherein said mold member on which said guiding means is to be disposed is provided with a space between a rail portion movably supporting the slide core disposed in said guiding means and an outer end of the mold member to thereby permit said slide core to be inserted into said space.

9. The slide core unit according to claim 2, wherein one of said slide core and said guiding means has a ball plunger for holding said slide core in its standby position away from said molding space to a prescribed extent with a greater force than an urging force of said urging means.

10. The slide core unit according to claim 1, wherein said mold member on which said guiding means is to be disposed is provided with a space between a rail portion movably supporting the slide core disposed in said guiding means and an outer end of the mold member to thereby permit said slide core to be inserted into said space.

11. The slide core unit according to claim 1, wherein one of said slide core and said guiding means has a ball plunger for holding said slide core in its standby position away from said molding space to a prescribed extent with a greater force than an urging force of said urging means.

* * * * *